United States Patent [19]
Melton

[11] 3,970,232
[45] July 20, 1976

[54] WELDING MACHINE
[76] Inventor: Vernon L. Melton, 9209 Meadowbrook Lane, Overland, Mo. 63114
[22] Filed: Dec. 16, 1974
[21] Appl. No.: 532,898

[52] U.S. Cl. .................................... 228/7; 228/32; 228/48; 219/124
[51] Int. Cl.² ........................................ B23K 37/02
[58] Field of Search .................. 228/7, 44.1, 47, 48, 228/32; 219/60 A, 124, 125 R, 125 PL

[56] References Cited
UNITED STATES PATENTS

| | | | |
|---|---|---|---|
| 3,126,472 | 3/1964 | Brems | 219/124 |
| 3,132,617 | 5/1964 | Miller et al. | 228/7 |
| 3,358,896 | 12/1967 | Kemp | 228/44.1 X |

Primary Examiner—Al Lawrence Smith
Assistant Examiner—K. J. Ramsey
Attorney, Agent, or Firm—Rogers, Eilers & Howell

[57] ABSTRACT

A welding machine holds a plurality of metal objects in abutting engagement, moves those abutting metal objects relative to a welding torch, and provides an angular disposition of that welding torch relative to the junction between the abutting portions of those abutting metal objects which foster the formation of a smooth and uniform weld at that junction. The welding torch is mounted on a support which can move as the abutting metal objects are moved relative to the welding torch; and that support can be moved to cause that welding torch to closely "track" the junction between the abutting portions of those abutting metal objects, and also to provide whatever angular disposition of that welding torch relative to that junction which is needed to foster the formation of a smooth and uniform weld at that junction.

32 Claims, 21 Drawing Figures

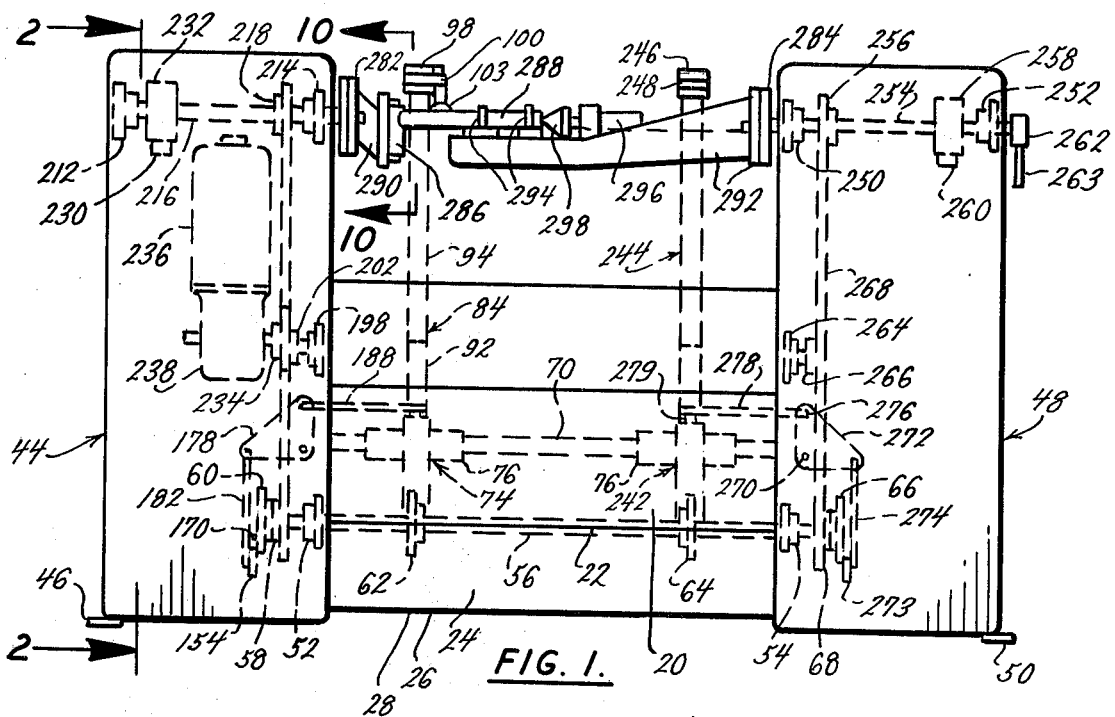
FIG. 1.
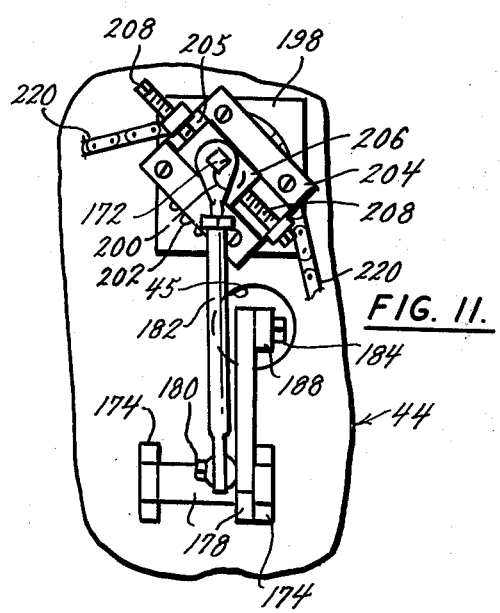
FIG. 11.
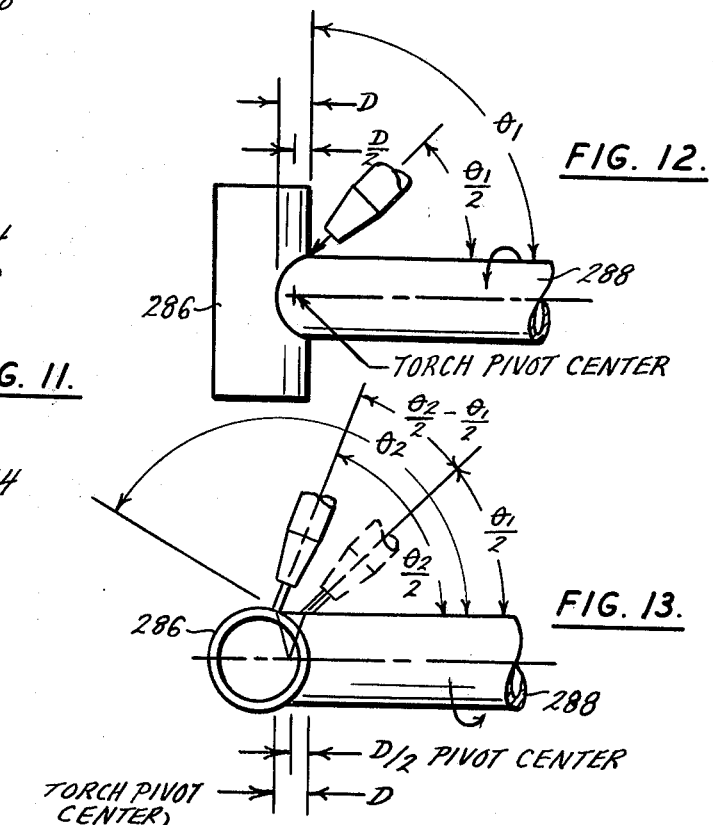
FIG. 12.
FIG. 13.
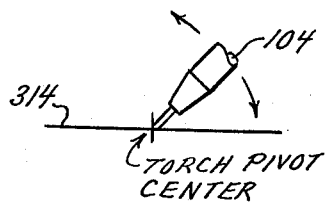
FIG. 14.
FIG. 15.

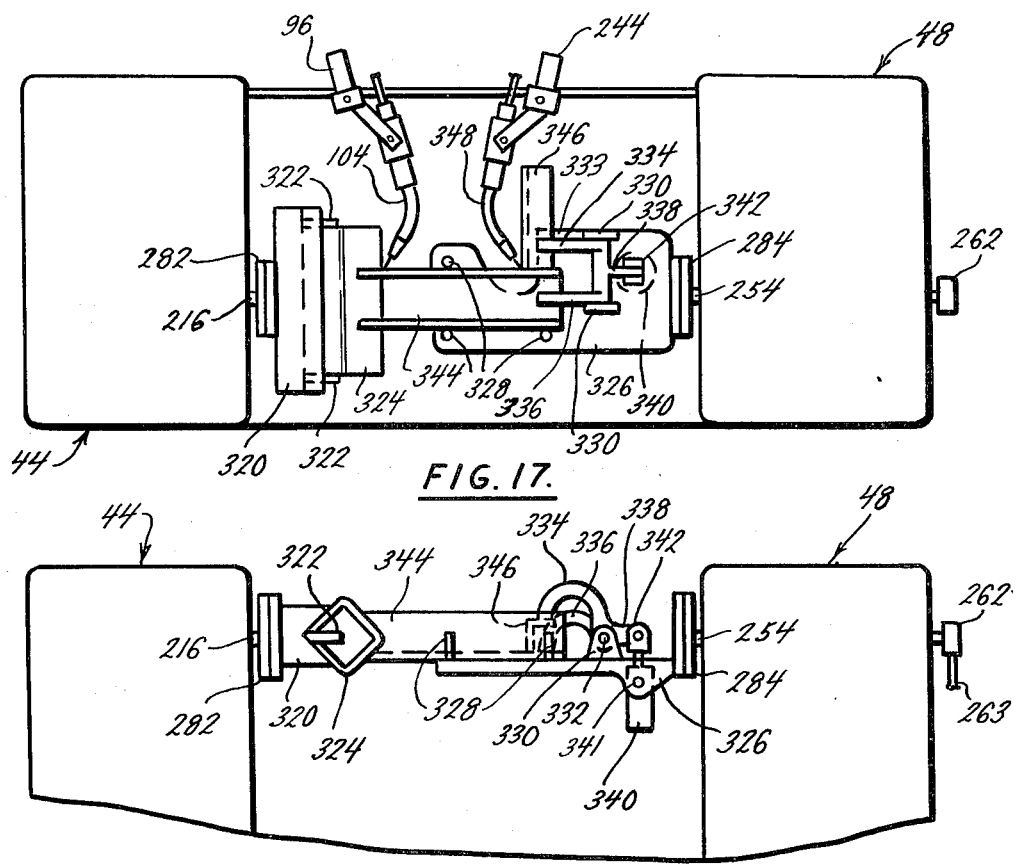
FIG. 17.
FIG. 18.
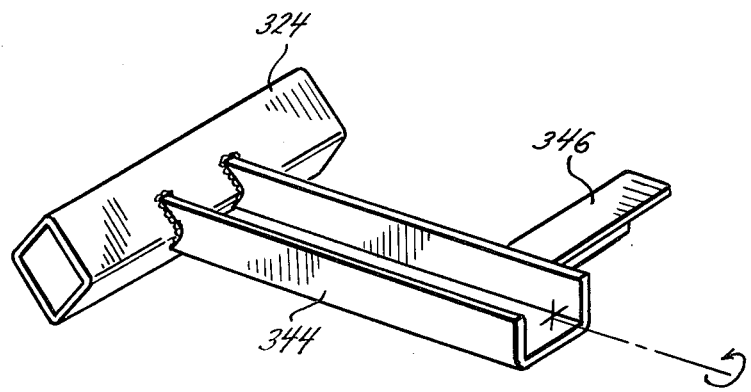
FIG. 19.

WELDING MACHINE

FIELD OF THE INVENTION

Where two cylindrical metal objects are to be welded together so the axis of one of those metal objects will be displaced a substantial acute or obtuse angle from the axis of the other of those metal objects, the junction between the confronting portions of those metal objects will not define a plane. Consequently, in welding any two such metal objects, it is necessary to provide aplanar relative movement of the junction between the confronting portions of those metal objects and the welding torch which will be used to form the weld at that junction. Undercutting of either or both of the confronting portions of those metal objects, and the forming of unduly-thick weld deposits on either of those confronting portions, can be avoided by varying the angle between the welding torch and those confronting portions during the relative aplanar movement of the junction between those confronting portions and the welding torch.

Summary of Present Invention

The present invention provides a welding machine which holds a plurality of metal objects in abutting engagement, moves those abutting metal objects relative to a welding torch, and provides an angular disposition of that welding torch relative to the junction between the abutting portions of those abutting metal objects which fosters the formation of a smooth and uniform weld at that junction. The welding torch is mounted on a support which can move as the abutting metal objects are moved relative to the welding torch; and that support can be moved to cause that welding torch to closely "track" the junction between the abutting portions of those abutting metal objects, and also to provide whatever angular disposition of that welding torch relative to that junction which is needed to foster the formation of a smooth and uniform weld at that junction. It is, therefore, an object of the present invention to provide a welding machine which holds a plurality of metal objects in abutting engagement, moves those abutting metal objects relative to a welding torch, and provides an angular disposition of that welding torch relative to the junction between the abutting portions of those abutting metal objects which fosters the formation of a smooth and uniform weld at that junction.

The welding machine provided by the present invention fixedly holds two metal objects in abutting engagement while it rotates those metal objects relative to a welding torch. That welding torch is mounted on a pivoted support; and that support can be pivoted, while the abutting metal objects are being rotated relative to that welding torch, to provide a desired angular disposition of that welding torch relative to the abutting portions of those abutting metal objects. Also, while those abutting metal objects are being rotated relative to that welding torch, the support can be moved to enable the welding torch to follow any axial and radial movements of the junction between the abutting portions of those abutting metal objects. It is, therefore, an object of the present invention to provide a welding machine which holds two metal objects in abutting engagement while it rotates those metal objects relative to a welding torch, and which mounts that welding torch on a pivoted support which can be moved, while those abutting metal objects are being rotated relative to that welding torch, to provide a desired angular disposition of that welding torch relative to the abutting portions of those abutting metal objects and also to enable that welding torch to follow any axial and radial movements of the junction between those abutting portions of those abutting metal objects.

The welding machine of the present invention holds the two metal objects in a "work area" as it rotates those metal objects relative to the welding torch; and it isolates that work area from the moving parts and controls of the welding machine by a barrier. As a result any weld spatter which develops in that work area can not reach those moving parts or controls. The pivoted support, on which the welding torch is mounted, is elongated and angular; so one portion thereof can be located in the area in which the moving parts and controls of the welding machine are located, and so another portion thereof can extend around the barrier and extend into the work area to support the welding torch. In this way, the moving parts and controls of the welding machine can cause the support for the welding torch to provide any desired movement of that welding torch and yet be protected from weld spatter. It is, therefore, an object of the present invention to provide a welding machine which holds two metal objects in a work area as it rotates those metal objects relative to a welding torch, which isolates that work area from the movable parts and controls of that welding machine by a barrier, and which provides an elongated and angular support that has one portion thereof located in the area in which the moving parts and controls of the welding machine are located and has another portion thereof extending around that barrier and extending into that work area to support that welding torch.

The welding machine of the present invention can simultaneously form two separate and distinct welds on a work piece, even though the configurations of those welds are quite different. That welding machine can do so; because it has two welding torches, it mounts those welding torches on independently-mounted supports, and it provides independent moving parts and controls for each of those welding torches. It is, therefore, an object of the present invention to provide a welding machine which has two welding torches, which mounts those welding torches on independently-mounted supports, and which provides independent moving parts and controls for each of those welding torches.

Other and further objects and advantages of the present invention should become apparent from an examination of the drawing and accompanying description.

In the drawing and accompanying description a preferred embodiment of the present invention is shown and described, but it is to be understood that the drawing and accompanying description are for the purpose of illustration only and do not limit the invention and that the invention will be defined by the appended claims.

BRIEF DESCRIPTION OF THE DRAWING

In the drawing,

FIG. 1 is a front elevational view of one preferred embodiment of welding machine that is made in accordance with the principles and teachings of the present invention.

FIG. 6 is a sectional view, on the scale of FIG. 2, through the welding machine of FIG. 1, and it is taken along the plane indicated by the line 6—6 in FIG. 4, FIG. 11 is a side elevational view of a portion of the welding machine of FIG. 1, and it is taken along the plane indicated by the line 2—2 in FIG. 1, but it shows one of the adjustable-length links of that welding machine in its alternate position, FIG. 12 is a kinematic view of a welding torch adjacent two metal tubes, FIG. 13 is another kinematic view of that welding torch and those metal tubes, FIG. 14 is a kinematic view of a welding torch which is movable about a torch pivot center that is located at the desired weld, FIG. 15 is a kinematic view of a welding torch which is movable about a torch pivot center that is located rearwardly of the tip of the welding rod of that welding torch, FIG. 17 is a plan view, on the scale of FIG. 2, of another set of work-supporting fixtures for the welding machine of FIG. 1, FIG. 18 is a front elevational view, on the scale of FIG. 2, of the set of work-supporting fixtures of FIG. 17, FIG. 19 is a perspective view, on a scale larger than FIG. 2, of a square tube, a channel, and an angle which are held by the set of work-supporting fixtures of FIG. 17.

DESCRIPTION OF THE PREFERRED EMBODIMENT

Figure 2:
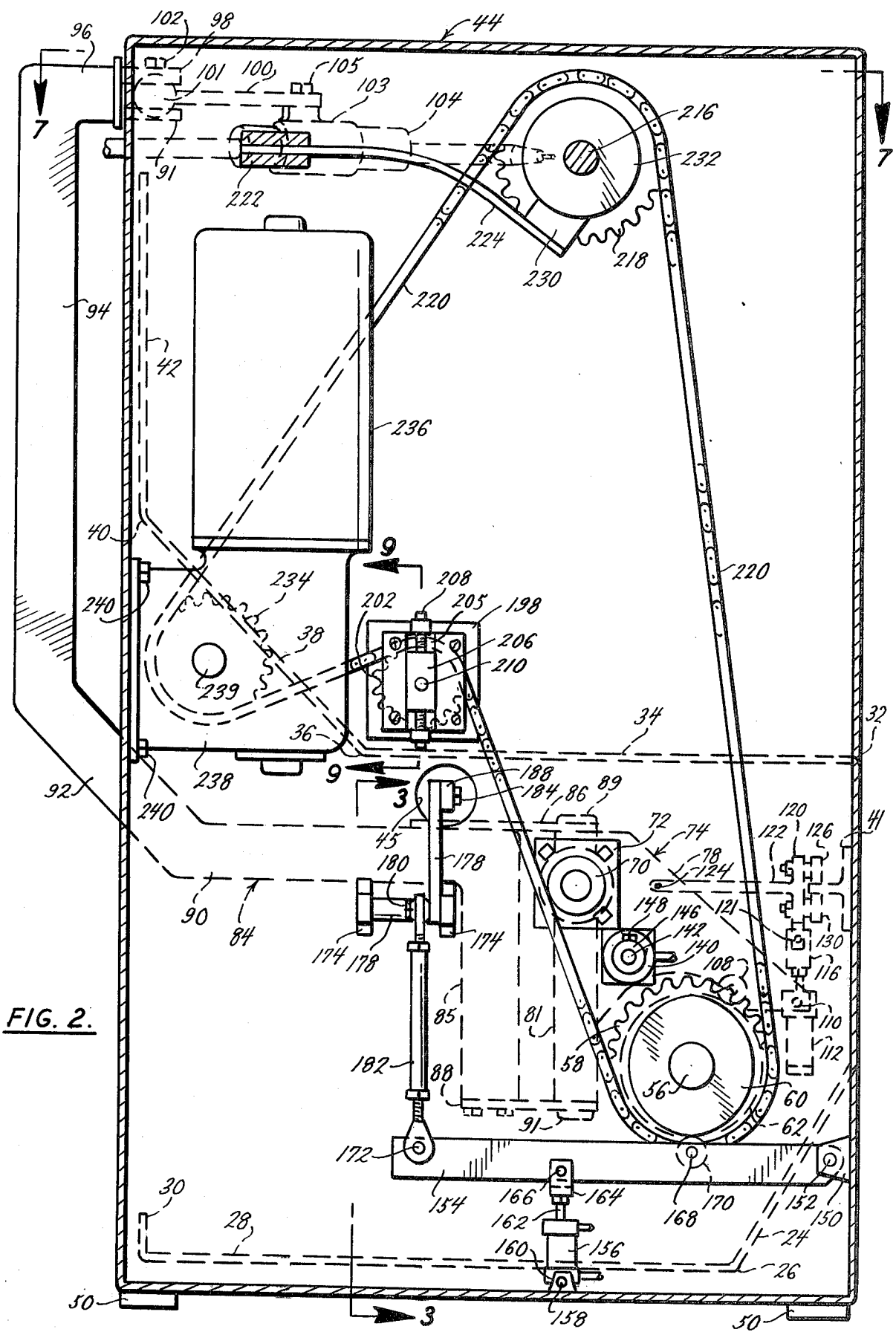
FIG. 2 is a sectional view, on a larger scale, through the welding machine of FIG. 1, and it is taken along the plane indicated by the line 2—2 in FIG. 1.

Referring to the drawing in detail, the numeral 20 denotes a vertically-directed portion of a wide metal plate, the numeral 22 denotes a bend line at the lower edge of that vertically-directed portion, and the numeral 24 denotes a portion of that metal plate which inclines downwardly and rearwardly from that bend line. The numeral 26 denotes a bend line at the lower edge of the inclined portion 24 of the metal plate, the numeral 28 denotes a horizontally-directed portion of that metal plate which extends rearwardly from that bend line, and the numeral 30 denotes an upwardly-bent flange at the rear edge of that horizontally-directed, rearwardly-extending portion. The numeral 32 denotes a bend line at the upper edge of the vertically-directed portion 20 of the metal plate, and the numeral 34 denotes a horizontally-directed portion which extends rearwardly from that bend line. The numeral 36 denotes a bend line at the rear edge of the horizontally-directed portion 34, and the numeral 38 denotes an inclined portion which inclines upwardly and rearwardly from that bend line. The numeral 40 denotes a bend line at the upper edge of the inclined portion 38; and the numeral 42 denotes a vertically-directed portion which extends upwardly from that bend line. The portions 20, 24, 28, 30, 34, 38 and 42 can be parts of a single piece of metal, or they can be separate parts which are welded together. The numeral 41 denotes a T-shaped metal bar which is suitably secured to the inner face of the vertically-directed portion 20, as shown particularly by FIG. 4.

The numeral 44 denotes a prismatic enclosure which is made of metal and which has the inner wall thereof welded to the adjacent edges of the portions 20, 24, 28, 30, 34, 38 and 42. An opening 45 is formed in that wall; and, as shown by FIG. 2, that opening is located below the level of the horizontally-directed portion 34. Feet 46 are provided on the bottom of the prismatic enclosure 44, as indicated by FIG. 1. The endmost wall of the prismatic enclosure 44 is removable to provide ready access to the components of the welding machine which are mounted within that enclosure.

The numeral 48 denotes a prismatic enclosure which is similar to the prismatic enclosure 44; and the inner wall of that prismatic enclosure is welded to the adjacent edges of the portions 20, 24, 28, 30, 34, 38 and 42. The prismatic enclosure 48 has an opening, not shown, which is comparable to the opening 45 in the prismatic enclosure 44; and that opening also is below the level of the horizontally-directed portion 34. Feet 50 are provided on the bottom of the prismatic enclosure 48, as indicated by FIG. 1. The endmost wall of the prismatic enclosure 48 is removable to provide ready access to the components of the welding machine which are mounted within that prismatic enclosure.

The upper portions of the confronting walls of the prismatic enclosures 44 and 48 coact with the portions 34, 38 and 42 to define a work area in which abutting metal objects can be welded together. Those upper portions of those confronting walls also coact with those portions to constitute a barrier which isolates the moving parts and controls of the welding machine from all weld spatter which may develop in the work area during welding of the abutting metal objects.

The numeral 52 denotes a bearing housing which is secured to the lower portion of the inner wall of the prismatic enclosure 44, as indicated by FIG. 1; and the numeral 54 denotes a similar bearing housing which is secured to the corresponding portion of the corresponding wall of the prismatic enclosure 48. Openings, not shown, are formed in those inner walls in register with those bearing housings; and those openings accommodate an elongated shaft 56 which is supported by the bearings within those bearing housings. The numeral 58 denotes a sprocket gear which is mounted on the shaft 56 at a point that is outward of the bearing housing 52. A cam 60 is releasably secured to the left-hand end of the shaft 56; and a cam 62 is releasably secured to that shaft within the space defined by the confronting walls of the prismatic enclosures 44 and 48. A cam 64 also is releasably secured to the shaft 56 within the space defined by the confronting walls of the prismatic enclosures 44 and 48. A sprocket gear 68 is mounted on the shaft 56 at a point that is outward of the bearing housing 54, as shown by FIG. 1; and the numeral 66 denotes a cam which is releasably securable to the right-hand end of that shaft. Because the cams 60 and 66 are located at the ends of the shaft 56, each of those cams can be made as a one-piece cam and yet be readily separable from that shaft. However, because the cams 62 and 64 are disposed intermediate the confronting walls of the prismatic enclosure 44 and 48, those cams preferably are made as sectional cams so they can be releasably secured to, or separated from, the shaft 56 by appropriate movement of the sections of those cams.

The numeral 70 denotes an elongated pivot which has the opposite ends thereof supported by pivot-supporting blocks. The pivot-supporting block 72 for one end of that pivot is secured to the inner wall of the prismatic enclosure 44, as shown by FIG. 2; and the pivot block, not shown, for the other end of that pivot is secured to the inner wall of the prismatic enclosure 48. As indicated by FIG. 1, the pivot 70 is parallel to, but is disposed above the level of, the shaft 56; and, as indicated by FIG. 2, that pivot is displaced rearwardly of that shaft.

Figure 4:
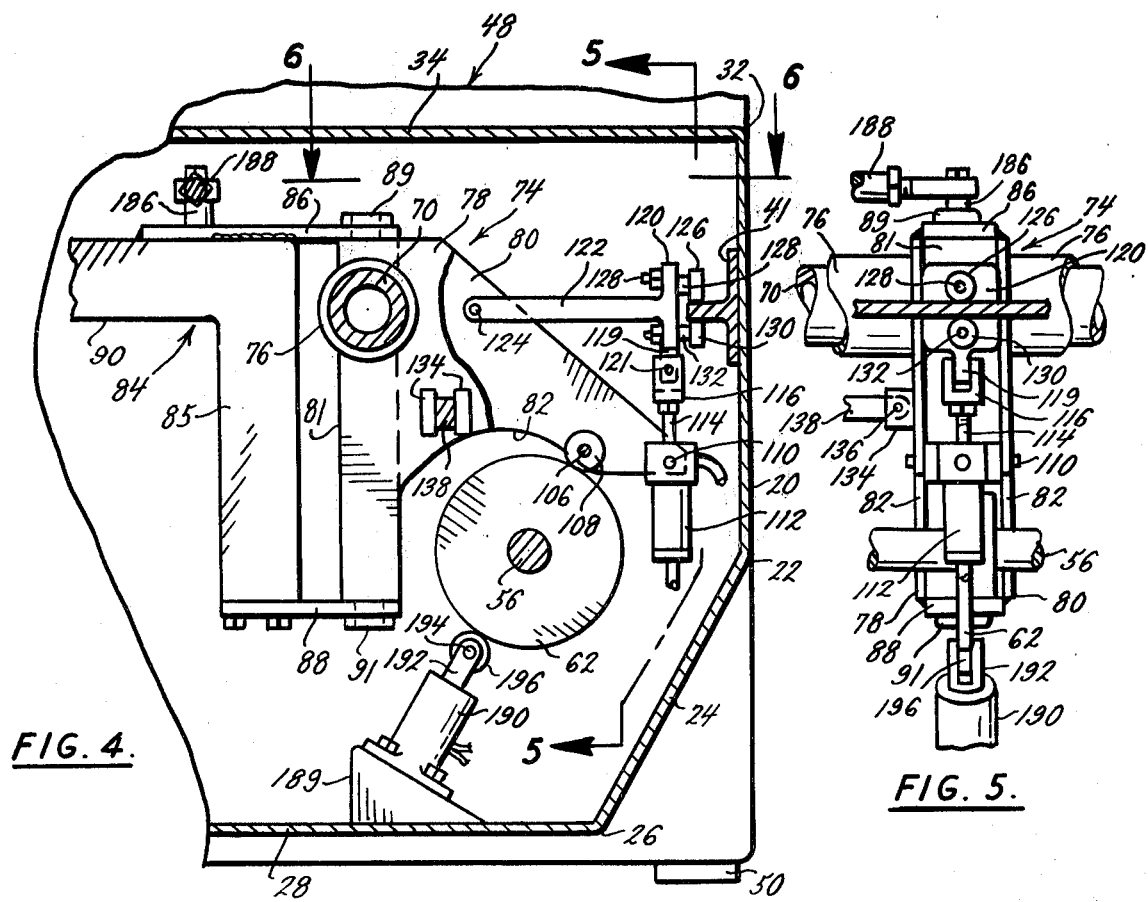
FIG. 4 is a sectional view, on the scale of FIG. 2, through the welding machine of FIG. 1, and it is taken along the plane indicated by the line 4—4 in FIG. 3.

The numeral 74 generally denotes a fabricated, tiltable pivot mounting which is rotatably supported by the pivot 70 and which is shown particularly by FIG. 4. That pivot mounting includes a horizontally-directed sleeve 76 that is telescoped over, and is rotatable relative to, the pivot 70; and it also includes two generally-triangular plates 78 and 80 which have concave notches in the upper rear edges thereof to accommodate the convex exterior of the sleeve 76. That pivot mounting also includes a vertically-directed tubular spacer 81 which has a short portion of the length thereof extending upwardly from the sleeve 76 but which has the major portion of the length thereof depending downwardly from that sleeve. The confronting ends of the upper and lower portions of the tubular spacer 81 preferably are welded to the upper and lower surfaces, respectively, of the sleeve 76. The concave notches in the upper rear edges of the plates 78 and 80 preferably are welded to the front of the sleeve 76, and the lower portions of the rear edges of those plates preferably are welded to the tubular spacer 81. As indicated by the numeral 82 in FIG. 4, portions of the lower edges of the plates 78 and 80 are cut away to define concave surfaces that are disposed above the level of the cam 62.

The numeral 84 generally denotes an elongated, angular, pivoted support which includes a tubular spacer 85, a horizontally-directed plate 86 which is welded to the top of that spacer, a horizontally-disposed plate 88 which is releasably secured to the bottom of that spacer by bolts, and a non-linear arm which has a horizontally-disposed rearwardly-extending portion 90, an upwardly and rearwardly inclined portion 92, a vertically-directed portion 94, and a horizontally-directed forwardly-extending portion 96, as shown by FIG. 2. The forward end of the horizontally-disposed plate 86 overlies the spacer 81 of the pivot mounting 74; and a bearing, not shown, permits that plate to rotate about the elongated axis of that spacer. The forward end of the horizontally-disposed plate 88 underlies the spacer 81 of the pivot mounting 74; and a bearing, not shown, enables that plate to rotate about the elongated axis of that spacer. Fasteners 89 and 91 secure the horizontally-disposed plates 86 and 88, and hence the elongated, angular, pivoted support 84, to the pivot mounting 74.

Figure 8:
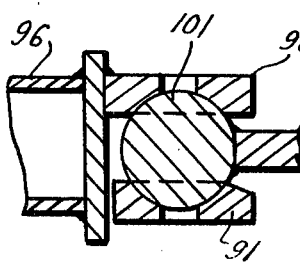
FIG. 8 is a sectional view, on a still larger scale, through the welding machine of FIG. 1, and it is taken along the plane indicated by the line 8—8 in FIG. 7.

As shown by FIG. 2, the portion 92 of the non-linear arm of the elongated, angular, pivoted support 84 extends rearwardly of the upwardly-inclined portion 38 and of the vertically-directed portion 42 of the metal plate; and the portion 94 of that non-linear arm extends upwardly above the level of the upper edge of the vertically-directed portion 42 of that metal plate. A clamp 98 is secured to, and projects forwardly from, the horizontally-directed portion 96 of the non-linear arm of the elongated, angular, pivoted support 84; and that clamp has a fixed upper plate and a movable lower plate 91. Spherical recesses in the confronting surfaces of those plates receive a ball 101 at the rear end of a supporting plate 100. The confronting surfaces of those plates and of that ball are shown particularly by FIG. 8. The plate 100 is thin enough, relative to the space between the plates of the clamp 98, to enable that plate to be tilted at any desired angle above and below the plate defined by the confronting faces of either of those plates. Because both sides of the clamp 98 are open, the plate 100 can be rotated to any desired position about an axis which is normal to that plane. Once the plate 100 has been given a desired position, set screws 102 can be tightened to urge the plates of the clamp 98 into holding engagement with the ball 101.

The numeral 103 denotes a split-sleeve holder for a welding torch 104; and that split-sleeve holder is fixedly secured to the plate 100 by a screw 105. That split-sleeve holder has two screws which can be loosened and re-tightened to permit that welding torch to be set at any desired position axially of that split-sleeve holder. The welding torch 104 preferably is an electric welding torch; but it could be a gas-type welding torch. The two-plate clamp 98, the plate 100, and the set screws 102 permit the tip of that welding torch to be set and held in any desired position relative to the horizontally-directed portion 96 of the non-linear arm of the elongated, angular, pivoted support 84; and the screws of the split-sleeve holder 103 can be loosened and then re-tightened to set the tip of that welding torch at the desired distance from the work piece.

The numeral 106 denotes a pivot which is located between the forward ends of the concave surfaces on the lower edges of the plates 78 and 80 of the pivot mounting 74, as shown by FIG. 4. A cam follower 108, in the form of an elongated roller, is rotatably mounted on the pivot 106, and hence is disposed between the confronting faces of the plates 78 and 80. That cam follower is in register with the periphery of the cam 62, as shown by FIG. 4.

Figure 5:
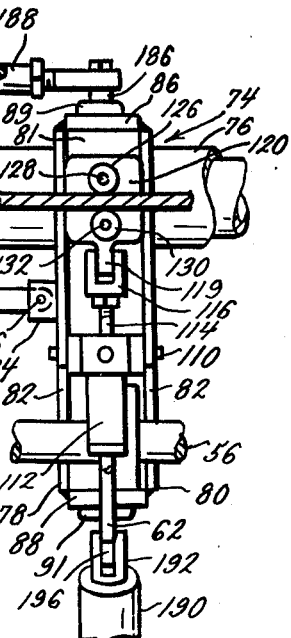
FIG. 5 is a sectional view, on the scale of FIG. 2, through the welding machine of FIG. 1, and it is taken along the broken plane indicated by the broken line 5—5 in FIG. 4.

The numeral 110 denotes a pivot which spans the space between the plates 78 and 80 of the pivot mounting 74; and that pivot supports the upper end of a double-acting pneumatic cylinder 112, as shown by FIGs. 4 and 5. The piston 114 of that cylinder extends upwardly above the level of the pivot 110; and it has a clevis-like upper end 116. The slot in that clevis-like upper end accommodates a downwardly-extending projection 119 on a vertically-disposed plate 120; and a pin 121 passes through openings in the sides of that clevis-like upper end and through an opening in that projection to hold that plate in assembled relation with the piston 114. The numeral 122 denotes an elongated arm which extends to the left from the plate 120, as that plate is viewed in FIG. 4; and a pivot 124 extends through an opening in that arm and through openings in the plates 78 and 80 of the pivot mounting 74. A roller 126 is rotatably mounted on a pivot 128 which extends forwardly from the plate 120, as indicated by FIG. 4; and that roller engages the upper surface of the T-shaped metal bar 41. The numeral 130 denotes a roller which is rotatably mounted on a pivot 132 which extends forwardly from the plate 120, as indicated by FIG. 4; and that roller engages the lower surface of the T-shaped metal bar 41. Because they overlie and underlie the upper and lower surfaces, respectively, of the T-shaped metal bar 41, the rollers 126 and 130 fix the position of the plate 120 and of the piston 114 relative to that T-shaped metal bar. When compressed air is applied to the lower port of the pneumatic cylinder 112, that compressed air will force that cylinder downwardly relative to the piston 114, and thus will force the cam follower 108 downwardly into engagement with the periphery of the cam 62. However, when compressed air is applied to the upper port of that cylinder that compressed air will force that cylinder to move upwardly relative to that piston, and thus will raise that cam follower upwardly out of engagement with the periphery of that cam.

The numeral 134 denotes two small, spaced-apart, vertically-disposed plates which are secured to the outer face of the plate 78 of the pivot mounting 74; and those plates constitute a pivot bracket. A pivot 136 is disposed within openings in the plates 134, and it pivotally secures a horizontally-disposed link 138 to the pivot mounting 74, as shown particularly by FIG. 3. That link preferably has self-aligning bearings at each end therof. The numeral 140 denotes a double-acting pneumatic cylinder which is secured to the inner wall of the prismatic enclosure 44, as shown particularly by FIG. 3; and the axis of the piston 142 of that cylinder lies in a horizontal plane which passes through the pivot 136 that is held by the plates 134. A pin 144 pivotally secures the link 138 to the piston 142; and the length of that link determines the spacing between that piston and the pivot mounting 74. The numeral 146 denotes a collar-type stop which encircles the outer end of the piston 142; and a set screw 148, which is carried by that stop, can be loosened and tightened to set that stop at any desired position along the length of the projecting end of that piston. When compressed air is applied to the left-hand port of the cylinder 140, the piston 142 will be in the position shown by FIG. 3. However, when compressed air is applied to the right-hand port of that cylinder, that piston will move until it engages the left hand end of that cylinder's chamber or until the stop 146 engages the right-hand end of that cylinder, whichever occurs first. By setting the stop 146 at various desired distances from the right-hand end of the cylinder 140, it is possible to provide various maximum spacings between the plate 78 of the pivot mounting 74 and the confronting wall of the prismatic enclosure 44.

The numeral 150 in the lower right-hand portion of FIG. 2 denotes two small plates which are secured to the inner face of the front wall of the prismatic enclosure 44; and those plates constitute a pivot bracket. A pivot 152 extends through an opening in the front of a horizontally-disposed elongated arm 154 and is seated within openings in the small plates 150. that arm is below the level of, but is generally in register with, the outer end of the shaft 56, as shown particularly by FIG. 3. A pneumatic cylinder 156 has the lower end thereof pivotally secured to the bottom of the prismatic enclosure 44 by small plates 160 and a pivot 158, as shown particularly by FIG. 2. The piston 162 of that cylinder has a clevis-like upper end 164 which accommodates the lower edge of the arm 154; and a pin 166 pivotally secures that arm to that clevis-like upper end. The numeral 168 denotes a pivot which is carried by the arm 154 intermediate the pivot 152 and the pin 166; and the pivot 168 rotatably supports a cam follower 170 which has the form of a roller. That cam follower is below, but is in register with, the periphery of the cam 60, as indicated particularly by FIG. 3. When air is applied to the lower port of the pneumatic cylinder 156, the piston 162 will cause the arm 154 to hold the cam follower 170 up in intimate engagement with the periphery of the cam 60. However, when compressed air is not applied to that port, gravity will tend to move that arm, and hence that cam follower, downwardly and away from the periphery of that cam. A pin 172 is secured to, and is carried by, the free end of the arm 154, as shown particularly by FIG. 2.

Figure 3:
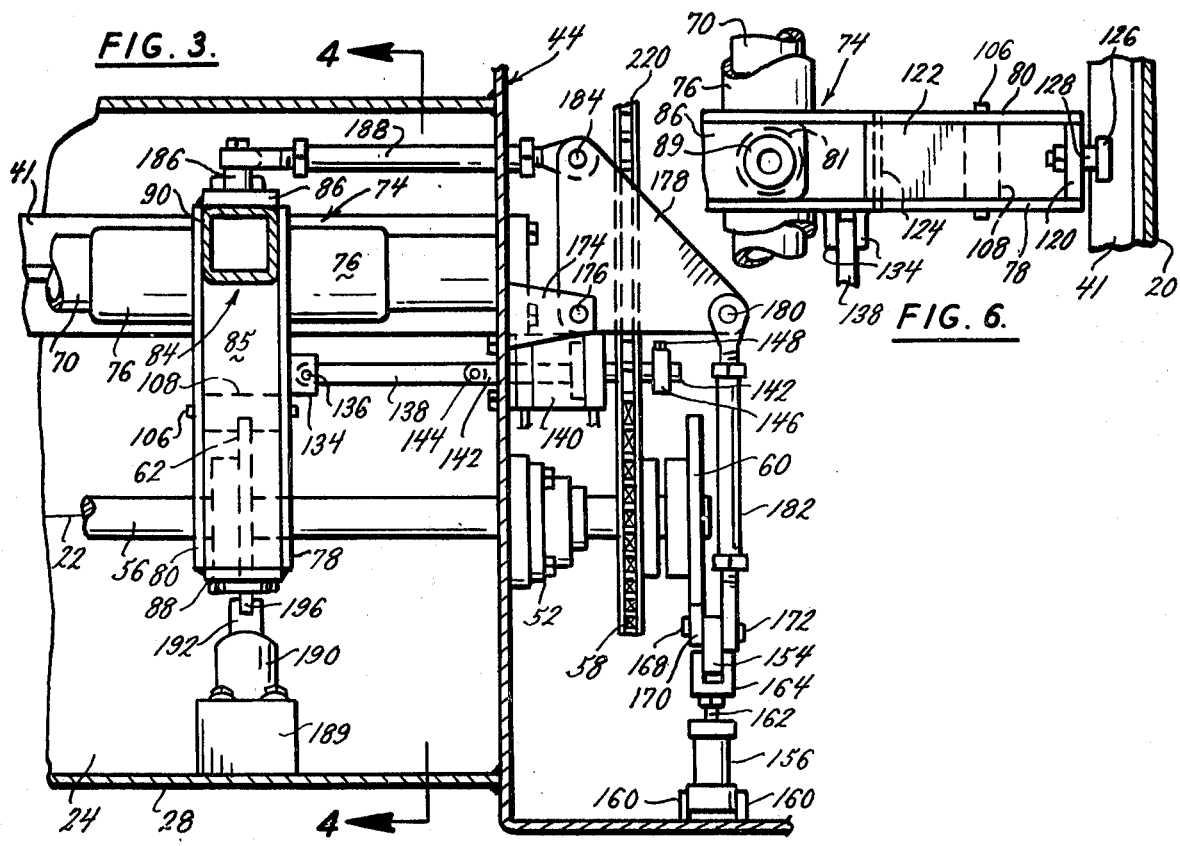
FIG. 3 is a sectional view, on the scale of FIG. 2, through the welding machine of FIG. 1, and it is taken along the plane indicated by the line 3—3 in FIG. 2.
Figure 7:
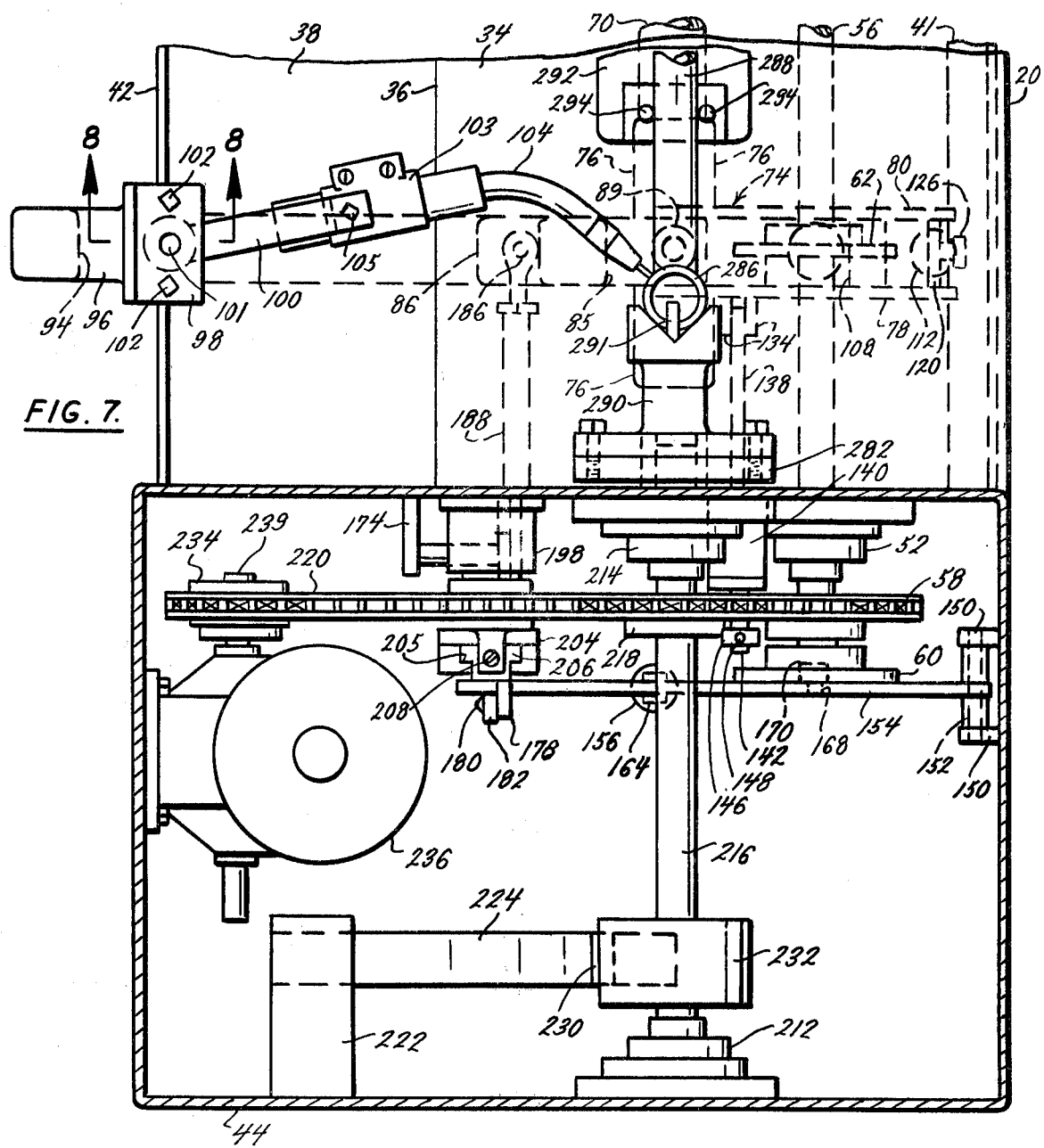
FIG. 7 is a sectional view, on the scale of FIG. 2, through the welding machine of FIG. 1, and it is taken along the plane indicated by the line 7—7 in FIg. 2.

The numeral 174 denotes small plates of frusto-triangular configuration which are mounted on the outer face of the inner wall of the prismatic enclosure 44, as shown by FIG. 3. Those plates are located above the level of the axis of the cylinder 140, as shown by FIGS. 2 and 3; and a pivot 176 extends through a hub on a generally-triangular plate 178 and is seated in openings in those frusto-triangular plates, as indicated by FIGS. 3 and 7. That hub is disposed between those frusto-triangular plates; and it holds the plate 178 at a right angle to the inner wall of the prismatic enclosure 44. A pin 180 is carried by the outer end of the plate 178; and it secures the upper end of a vertically-directed, adjustable-length link 182 to that plate. The lower end of that adjustable-length link is secured to the free end of the arm 154 by the pin 172 as shown by FIG. 2. The numeral 184 denotes a pin which is carried by the upper end of the plate 178; and that pin secures one end of a horizontally-directed, adjustable-length link 188 to that plate. The other end of that adjustable-length link is held by a pin 186 which extends upwardly from the plate 86 of the elongated, angular, pivoted support 84, as indicated by FIGS. 3 and 4.

The numeral 190 denotes a potentiometer which is mounted on a triangular base 189 that is secured to the horizontally-directed portion 28 of the metal plate, as shown by FIGS. 3 and 4. The actuator 192 of that potentiometer is slotted to accommodate a cam follower 196 in the form of a roller. A pivot 194 extends through that roller and is held by the arms of the upper end of that actuator. A spring, not shown, within that potentiometer urges the cam follower 196 up into engagement with the periphery of the cam 62.

The numeral 198 denotes a bearing block which is secured to the inner wall of the prismatic enclosure 44, as indicated by FIGS. 1 and 7. A pivot 200 has the inner end thereof extending through the hub of a sprocket gear 202 and through a washer to extend into a socket in that pivot block; and a set screw 203 holds that pivot against separation from that pivot block. That pivot has a head at the outer end thereof which is disposed within a cylindrical recess in the outer face of the hub of the sprocket gear 202.

Figure 9:
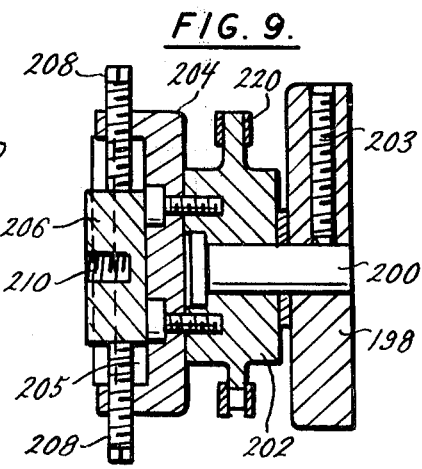
FIG. 9 is a sectional view, on an even larger scale, through the welding machine of FIG. 1, and it is taken along the plane indicated by the line 9—9 in FIG. 2.
Figure 10:
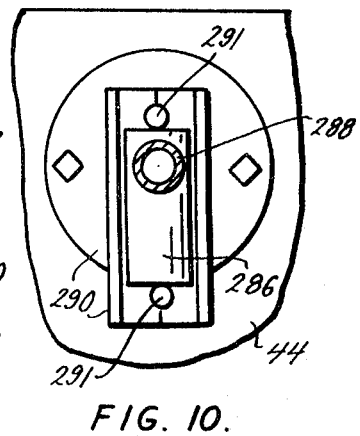
FIG. 10 is a sectional view, on the scale of FIG. 2, through the welding machine of FIG. 1, and it is taken along the plane indicated by the line 10—10 in FIG. 1.

A suitable sleeve or anti-friction bearing, not shown, will be used to rotatably mount that gear on that pivot. The numeral 204 denotes a thick plate which is rectangular in side elevation, as indicated by FIGS. 2 and 11; and that plate is secured to the sprocket gear 202 by screws. That plate has a recess 205 in the outer face thereof which is T-shaped in cross section, as indicated by FIG 7; and a block 206, which is T-shaped in cross section, is disposed within that recess. As indicated by FIG. 9, the length of the block 206 is less than the length of the recess 205; and hence that block can be shifted endwise relative to that recess. Threaded rods 208 are mounted in threaded openings at the opposite ends of the recess 205; and the confronting ends of those threaded rods engage, and thereby fix the axial position of, the block 206. That block has a threaded socket 210 in the outer face thereof, as shown by FIG. 9. The plate 204 is made in two pieces to facilitate the insertion of the T-shaped block 206 within the T-shaped recess 205 in that plate.

The numeral 212 denotes a pivot block which is secured to the inner face of the outer wall of the prismatic enclosure 44, as shown particularly by FIGS. 1 and 7; and the numeral 214 denotes a similar pivot block which is secured to the confronting face of the inner wall of that prismatic enclosure. A shaft 216 is rotatably held by bearings within the pivot blocks 212 and 214; and that shaft is located close to the top of the prismatic enclosure 44, as indicated by FIGS. 1 and 2. A sprocket gear 218 is mounted on the shaft 216, as indicated by FIG. 2; and that sprocket gear coacts with the sprocket gears 58, 202 and a sprocket gear 234 to define a plane. A sprocket chain 220 engages the teeth on all four of those sprocket gears; and it responds to driving forces from the sprocket gear 234 to rotate the other three of those sprocket gears.

The numeral 222 denotes a bracket which is secured to the inner surface of the outer wall of the prismatic enclosure 44, as indicated by FIG. 7. An elongated resilient arm 224 is secured to the support 222 and extends toward the shaft 216; and it resiliently holds an electric brush 230 in engagement with a slip ring 232 on that shaft. That support, that resilient arm, that brush, and that slip ring provide a low-resistance electrical path from the prismatic enclosure 44 to the shaft 216; and such a path is important where the welding torch 104 is an electric welding torch.

The numeral 236 denotes a variable speed D.C. electric motor; and that electric motor has a gear housing 238 secured to the lower end thereof. The output shaft 239 of that gear housing has the sprocket gear 234 mounted on it; and, as a result, whenever the motor 236 is energized, the sprocket gear 234 will cause the sprocket chain 220 to rotate the sprocket gears 58, 202 and 218. Fasteners 240, such as set screws or bolts, secure the gear housing 238 to the rear wall of the prismatic enclosure 44. Suitable loosening and re-tightening of those fasteners enables the sprocket gear 234 to be set in position to act as a chain-tightening, as well as a chain-driving, sprocket gear.

The numeral 242 in FIG. 1 generally denotes a fabricated, tiltable pivot mounting which can be identical to the fabricated, tiltable pivot mounting 74. The pivot mounting 242 is mounted on the pivot 70 intermediate the pivot mounting 74 and the prismatic enclosure 48. The numeral 244 generally denotes an elongated, angular, pivoted support which can be identical to the elongated, angular, pivoted support 84. The elongated, angular, pivoted support 244 is pivotally secured to the rear of the pivot mounting 242 in the same manner in which the elongated, angular, pivoted support 84 is pivoted to the rear of the pivot mounting 74. The non-linear arm of the elongated, angular, pivoted support 244 has a slotted clamp 246 secured thereto; and that slotted clamp adjustably holds a plate 248. That slotted clamp preferably is identical to the slotted clamp 98; and that plate preferably is identical to the plate 100. The plate 248 can be used to hold a welding torch, not shown, in the work area which is defined by the confronting faces of the prismatic enclosures 44 and 48 and by the portions 34, 38 and 42 of the metal plate.

The numeral 250 denotes a pivot block which is secured to the upper portion of the inner wall of the prismatic enclosure 48; and that pivot block is coaxial with the shaft 216 within the prismatic enclosure 44. The numeral 252 in FIG. 1 denotes a pivot block which is secured to the inner surface of the outer wall of the prismatic enclosure 48; and that pivot block also is coaxial with the shaft 216. The pivot blocks 250 and 252 rotatably support a hollow shaft 254; and a sprocket gear 256 is mounted on, and rotates with, that shaft. That sprocket gear is located intermediate the pivot blocks 250 and 252 as shown by FIG. 1. A slip ring 258, which can be identical to the slip ring 232, is mounted on the shaft 254 intermediate the sprocket gear 256 and the pivot block 252. An electrical brush 260, which can be identical to the electrical brush 230, is mounted on an elongated resilient arm, not shown, that can be identical to the elongated resilient arm 224 of FIGS. 2 and 7. The numeral 262 denotes a rotation-enabling coupling which is mounted on the outer end of the hollow shaft 254; and that coupling provides an air-tight seal between the center of that shaft and an air hose 263, while permitting that air hose to remain stationary.

The numeral 264 denotes a bearing block which is mounted on the inner wall of the prismatic enclosure 48; and that bearing block preferably is identical to, and coaxial with, the bearing block 198. The numeral 266 denotes a sprocket gear which is supported by the bearing block 264; and that sprocket gear preferably is identical to the sprocket gear 202. A thick plate, not shown, like the thick plate 204, and a T-shaped block, not shown, like the T-shaped block 206, are mounted on and are rotatable with the sprocket gear 266. A sprocket gear, not shown, which preferably is identical to the sprocket gear 234, is mounted on the prismatic enclosure 48 in register with the latter sprocket gear; and that sprocket gear coacts with the sprocket gear 266 and with the sprocket gear 68 and with the sprocket gear 256 to define a plane. The numeral 268 denotes a sprocket chain which extends around, and engages the teeth of, each of the sprocket gears 68, 256 and 266 and also extends around, and engages, the teeth of the sprocket gear which is in register with the sprocket gear 234, so rotation of the sprocket gear 68 will cause rotation of those other sprocket gears. The sprocket gear which is in register with the sprocket gear 234 will be adjustably mounted so it can serve as a chain-tightening sprocket gear.

The numeral 270 denotes a pivot which is suitably fixed secured to the inner wall of the prismatic housing 48; and that pivot is generally in register with the pivot 176, as shown by FIG. 1. A generally-triangular plate 272 is pivotally mounted on the pivot 270; and that plate preferably is identical to, and aligned with, the generally-triangular plate 178. A vertically-directed, adjustable-length link 274, that preferably is identical to the adjustable-length link 182, has the upper end thereof pivotally secured to the outer end of the generally-triangular plate 272; and it has the lower end thereof pivotally secured to an elongated arm 273 which preferably is identical to the elongated arm 154. A pin 276 at the upper end of the generally-triangular plate 272 supports one end of a horizontally-directed adjustable-length link 278; and that pin and that adjustable-length link preferably are identical to the pin 184 and to the adjustable-length link 188. The other end of the adjustable-length link 278 is pivotally secured to the elongated, angular, pivoted support 244 by a pin 279, as indicated by FIG. 1.

The numeral 282 denotes a face plate which is mounted on the inner end of the shaft 216; and the numeral 284 denotes a similar face plate which is mounted on the inner end of the shaft 254. Those face plates are disposed within the work area which is defined by the confronting walls of the prismatic enclosures 44 and 48 and by the portions 34, 38 and 42 of the metal plate. The numeral 286 denotes a short metal tube to which an elongated metal tube 288 is to be welded with the axes of those metal tubes at a right angle to each other. The left-hand end of the tube 288 is pre-cut to be complementary to the outer surface of the tube 286. Those tubes constitute a work piece which will be disposed within the work area and which will be moved relative to the welding torch 104.

Figure 16:
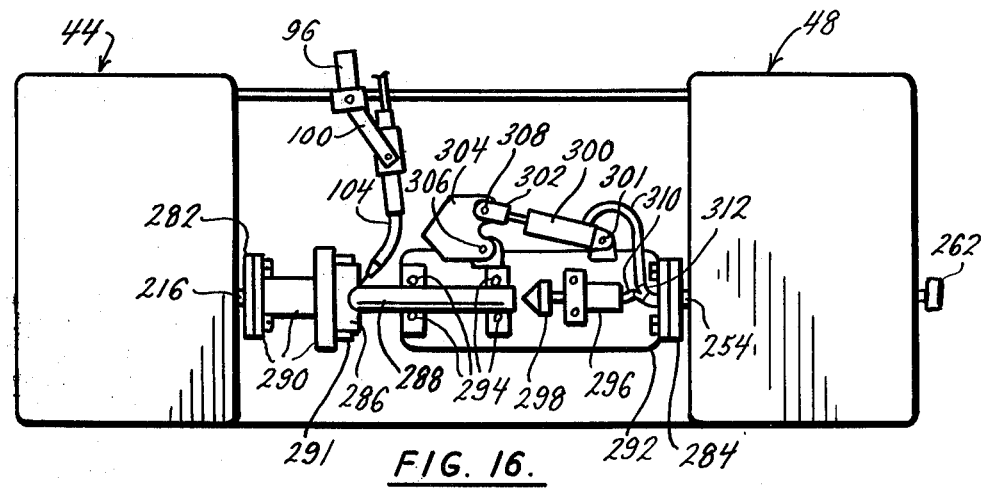
FIG. 16 is a plan view, on the scale of FIG. 2, of the work-supporting fixtures for the welding machine of FIG. 1.

The numeral 290 denotes a fixture which is rigidly, but releasably, secured to the face plate 282; and that fixture has a V-shaped recess in the inner face thereof to accommodate and guide the metal tube 286, as shown by FIG. 7. Pin-like stops 291 are disposed in that V-shaped recess above and below the position to be occupied by that metal tube. The numeral 292 denotes an elongated fixture which is rigidly, but releasably, secured to the face plate 284; and that fixture extends toward the fixture 290. Four guiding projections 294 are carried by the fixture 292; and those guiding projections define an area in which the metal tube 288 can be disposed and held. The numeral 296 denotes a pneumatic cylinder which is mounted on the fixture 292; and a pressure member 298 with a conical end is mounted on the free end of the piston of that cylinder. As shown by FIG. 16, the conical end of that pressure member is aligned with, so it can bear against, the right-hand end of the metal tube 288. A confining plate 304 is pivotally mounted on the fixture 292 by a pivot 306; and that plate can be moved into position above the metal tube 288 to hold that metal tube in the area which is defined by the guiding projections. A pneumatic cylinder 300 is pivotally mounted on the fixture 292 by a pivot 301; and a clevis-like connector 302 is mounted on the free end of the piston of that cylinder. A pin 308 pivotally connects the clevis-like connector to the confining plate 304. Hoses 310 and a Tee 312 for those hoses connect the cylinders 296 and 300 to the hollow center of the shaft 254.

Returning springs, not shown, within the cylinders 296 and 300 normally hold the pressure member 298 and the confining plate 304 in the loading and unloading position shown by FIG. 16. However, when the hose 263, the rotation-permitting coupling 262, the hollow shaft 254, and the Tee 312 supply compressed air to the hoses 310, the cylinders 296 and 300 will force the conical end of the pressure member 298 into the right-hand end of the metal tube 288 and will force the confining plate 304 into position over that metal tube. At such time, the left-hand end of the metal tube 288 will be forced into, and will be held in, intimate engagement with the side of the metal tube 286.

"Setting Up" the Preferred Embodiment

As indicated by FIGS. 12 and 13, the upper and lower edges of the pre-cut, left-hand end of the metal tube 288 extend inwardly beyond the periphery of the metal tube 286 by a distance D. However, the portions of that pre-cut left-hand which are midway of those upper and lower edges engage the periphery of the metal tube 286. This means that any weld which is developed at the junction between the metal tubes 286 and 288 must move axially of the metal tube 288 a distance D. Consequently, to provide a continuous smooth weld, the welding torch 104 must move through the distance D during each quarter-revolution of the metal tube 288. Further, to avoid undercutting of either of the abutting surfaces of the metal tubes 286 and 288, and also to avoid the deposition on either of those abutting surfaces of undue amounts of welding material, the axis of that welding torch should swing back and forth, about the axis of the tubular spacer 81 of the pivot mounting 74, to be close to the bisector of the instantaneous angle subtended by the adjacent surfaces of those metal tubes.

Because the axis of the metal tube 288 is co-axial with the shafts 216 and 254, and because the cross section of that metal tube is circular, the welding torch 104 does not have to move radially relative to that metal tube. Consequently, the cam 62 can be a circular disk which is concentric with the shaft 56, as shown by FIG. 4. Because the tip of the welding torch 104 must move axially relative to the metal tube 288, as that welding torch swings back and forth about the axis of the tubular spacer 81 of the pivot mounting 74, the pivot center for that welding torch should be disposed at the axis of the metal tube 288, as indicated by FIG. 12.

When the metal tubes 286 and 288 occupy the position relative to the welding torch 104 which is shown by FIG. 12, the instantaneous angle $\sigma_1$ subtended by the adjacent surfaces of those metal tubes is 90°; but when those metal tubes occupy the position relative to that welding torch which is shown by FIG. 12, the instantaneous angle $\sigma_2$ subtended by the adjacent surfaces of those metal tubes is about 150°—the subtended angle $\sigma_2$ being defined by the surface of the metal tube 288 and by a tangent to the surface of the metal tube 286. As a result, the axis of the welding torch 104 should swing back and forth, about the axis of the tubular spacer 81 of the pivot mounting 74, from an angle $\sigma_1/2$ which is displaced from the surface of the metal tube by about 45° to an angle $\sigma_2/2$ which is displaced from that surface by about 75°. As that axis is swung back and forth between the angles $\sigma_1/2$ and $\sigma_2/2$, that axis will move axially of the metal tube 288. To enable the tip of the welding rod of that welding torch to move through the distance D during each quarter-revolution of the metal tube 288, that tip should be displaced from the TORCH PIVOT CENTER of FIG. 12 a distance equal to D/2 divided by the sine of an angle equal to one-half of the difference between $\sigma_2$ and $\sigma_1$. The operator of the welding machine can determine the distance D, the angles $\sigma_1$ and $\sigma_2$, and the displacement of the tip of the welding rod of the welding torch 104 graphically or by simple trigonometry.

To dispose the TORCH PIVOT CENTER of FIG. 12 at the axis of the metal tube 288, the diameter of the circular cam 62 should be selected so the axis of the tubular spacer 81 of the pivot mounting 74 passes directly through the axis of that metal tube, as indicated by FIG. 2. To cause the axis of the welding torch 104 to swing back and forth between the angles $\sigma_1/2$ and $\sigma_2/2$, the cam 60 will be provided with rises and falls that will enable the cam follower 170, the elongated arm 154, the adjustable-length link 182, the generally-triangular plate 178, and the adjustable-length link 188 to cause the elongated, angular, pivoted support 84 to oscillate, about the axis of the tubular spacer 81 of the pivot mounting 74, through an angle equal to $\sigma_2/2 - \sigma_1/2$. Because the cam follower 170 is located intermediate the ends of the elongated arm 154 whereas the pin 172 is located at the free end of that elongated arm, that pin will have a greater length of travel than will the pin 168 which supports that cam follower. The resulting mechanical advantage enables the rises and falls on the cam 60 to be only fractions of the movement of the adjustable-length link 188 axially of the pivot 70.

A cam, not shown, is mounted on the shaft 216 within the prismatic enclosure 44; and limit switches, not shown, are mounted adjacent that cam. That cam and those limit switches will be set to establish a loading and unloading position for the fixtures 290 and 292, and to provide weld-initiating and weld-terminating positions for those fixtures. That cam and those limit switches can be set to cause the shafts 216 and 254 to operate unidirectionally; or they can be set to cause those shafts to rotate pre-determined positions in one direction and then to rotate back in the opposite direction.

The shaft 56 maintains a pre-set, fixed relationship between the sprocket gears 58 and 68; and the diameters of those sprocket gears are equal. In addition, the diameters of the sprocket gears 218 and 256 are equal; and, consequently, the shafts 216 and 254 will rotate in the same direction and at the same speed.

The D.C. motor 236 will cause the fixtures 290 and 292 to rotate the metal tubes 286 and 288 about the axis of the latter metal tube at a speed which is determined by the settings of a speed-controlling potentiometer, not shown, and of the actuator 192 of the potentiometer 190. Because the cross sections of both of the metal tubes 286 and 288 are circular, the welding torch 104 can provide a strong and smooth weld at the joint between those metal tubes if the metal tube 288 is rotated at a constant speed. That speed can be provided by an appropriate setting of the speed-controlling potentiometer; and that speed will not be varied by the potentiometer 190, because the cam 62 will be a circular disk which is concentric with the shaft 56.

Operation of the Preferred Embodiment

Whenever the welding machine is in its "standby" condition, the fixtures 290 and 292 will be in their loading and unloading positions; and the pressure member 298 and the confining plate 304 of the latter fixture will be in their retracted positions. The elongated, angular, pivoted support 84 usually will be holding the welding torch 104 displaced horizontally from the fixtures 290 and 292; but, if desired, that elongated angular, pivoted support can be programmed to hold that welding torch adjacent those fixtures. To "load" the welding machine, the operator will set a metal tube 286 within the V-shaped recess in the free end of the fixture 290; and the pins 291 will fix the axial position of that metal tube. A metal tube 288 will then be set in position between the guiding projections 294 on the fixture 292; and the pre-cut end of that metal tube will be set adjacent the surface of the metal tube 286, and the opposite end of that metal tube will confront the pressure member 298.

At this time, the operator of the welding machine will press a "start" button on the control panel, not shown, of that welding machine; and, thereupon, compressed air will be supplied to the cylinders 296 and 300, via hose 263, rotation-permitting coupling 262, hollow shaft 254, Tee 312, and hoses 310, to force the pressure member 298 into intimate engagement with the right-hand end of the metal tube 288 and to dispose the confining plate 304 in position over that metal tube. At such time, the pre-cut, left-hand end of that metal tube will intimately engage the right-hand side of the metal tube 286; and that pre-cut, left-hand end will be held in intimate engagement with that right-hand side throughout the welding cycle which was initiated by the pressing of the start button. If compressed air had been applied to the upper port of the cylinder 112 to cause the elongated, angular, pivoted support 84 to hold the welding torch 104 displaced horizontally from the fixtures 290 and 292, that compressed air would be vented to the atmosphere; and compressed air would then be applied to the lower port of that cylinder to cause that elongated, angular, pivoted support to move that welding torch into position adjacent the junction between the metal tubes 286 and 288. The clamping of the metal tubes 286 and 288 to the fixtures 290 and 292 and the positioning of the welding torch 104 adjacent the junction between those metal tubes will preferably occur simultaneously and will preferably occur immediately after the pressing of the start button. Almost immediately thereafter, the motor 236 will, via the sprocket gears 234, 218, 58, 202, 68, 266, and 256 and the sprocket gear corresponding to the sprocket gear 234, the sprocket chains 220 and 268, the shafts 216, 56 and 254, and the fixtures 290 and 292, start rotating the metal tubes 286 and 288; and the welding torch 104 will start welding the junction between those metal tubes.

As the fixtures 290 and 292 rotate in the direction indicated by the arrow in FIG. 12, the cam 60 will act through the cam follower 170, the elongated arm 154, the adjustable-length link 182, the generally-triangular plate 178, and the adjustable-length link 188 to rotate the elongated, angular, pivoted support 84 in the counterclockwise direction toward the position of FIG. 7. During the first quarter-revolution of the metal tube 288, the welding torch 104 will be moved from the dotted-line position to the solid-line position of FIG. 13; and, as it is so moved, the tip of the welding rod of that welding torch will closely track the joint between the metal tubes 286 and 288. Importantly, the axis of that welding torch will, throughout that quarter-revolution, always be close to the bisector of the angle subtended by the adjacent surfaces of those metal tubes.

During the second quarter-revolution of the metal tube 288, the welding torch 104 will be moved in the clockwise direction from the solid-line position to the dotted-line position of FIG. 13; and, again, the tip of the welding rod of that welding torch will closely track the joint between the metal tubes 286 and 288, and the axis of that welding torch will, throughout that quarter-revolution, always be close to the bisector of the angle subtended by the adjacent surfaces of those metal tubes. During the third quarter revolution of the metal tube 288, the welding torch 104 will again be moved from the dotted-line position to the solid-line position of FIG. 13; and during the last quarter-revolution of that metal tube, that welding torch will again be moved in the clockwise direction from the solid-line position to the dotted-line position of FIG. 13. During each of the third-quarter and last-quarter revolutions of the metal tube 288, the tip of the welding rod of that welding torch will closely track the joint between the metal tubes 286 and 288 and the axis of that welding torch will, throughout each quarter-revolution, always be close to the bisector of the angle subtended by the adjacent surfaces of those metal tubes. As a result, a strong, smooth weld will be formed at the junction of the metal tubes 286 and 288; and that weld will be free from under-cutting and from the formation of unduly-thick deposits of welding material on either of those metal tubes.

During each quarter-revolution of the metal tube 288, compressed air will continue to cause the cylinder 112 to hold the cam follower 108 in intimate engagement with the periphery of the cam 62. Also, compressed air, which is applied to the lower port of the pneumatic cylinder 156, will act through the elongated arm 154 to cause the cam follower 170 to precisely follow the periphery of the cam 60.

As the fixtures 290 and 292 rotate the metal tubes 286 and 288 to the end of the last quarter-revolution of those metal tubes, the cam and the limit switches within the prismatic enclosure 44 will automatically halt the welding current to the welding torch 104 and will automatically de-energize the motor 236. Immediately thereafter, the compressed air which had been causing the cylinders 296 and 300 to hold the metal tubes 286 and 288 in position in the fixtures 290 and 292 will be vented to the atmosphere to permit the pressure member 298 and the confining plate 304 to move to their retracted positions. Also, immediately thereafter, if the welding torch 104 is to be moved away from the fixtures 290 and 292 for unloading and loading purposes, the compressed air which had been applied to the lower port of the cylinder 112 will be vented to the atmosphere; and compressed air will be applied to the upper port of that cylinder to move that welding torch 104 away from those fixtures. Thereupon, the welded metal tubes 286 and 288 can be removed from the welding machine.

During the hereinbefore-described cycle of operation of the welding machine, weld spatter will develop; and some of that weld spatter may engage the surface of the welding torch 104, the split-sleeve clamp 103, the plate 100, the slotted clamp 98, and the portion 96 of the non-linear arm of the elongated, angular, pivoted support 84. In addition, of course, weld spatter will contact the fixtures 290 and 292 and the parts thereof. However, the confronting walls of the prismatic enclosures 44 and 48 and the portions 34, 38 and 42 of the metal plate will keep weld spatter from reaching the moving parts and controls of the welding machine; because those moving parts and controls are located in those prismatic enclosures or below the portions 34 and 38 of that metal plate. As a result, the moving parts and controls of the welding machine are protected against any and all degrading due to weld spatter.

Where the objects to be welded together are circular in cross section and are to have the axes thereof displaced ninety degrees, the sprocket gear 202, the plate 204, the T-shaped block 206, the threaded socket 210, and the adjustable-length link 182 can be used to perform the functions that normally are performed by the cam 60, the cam follower 170, and the elongated arm 154. Specifically, the pin 172 can be removed from the free end of the elongated arm 154 and can be screwed into the threaded opening 210 in the T-shaped block 206 to enable the adjustable length link 182 to connect the generally-triangular plate 178 to that T-shaped block. The threaded rods 208 can be rotated to shift the axis of the pin 172 eccentrically of the axis of the sprocket gear 202; and the distance between those axes should be set to enable rotation of the plate 204 to provide a movement of the top of the welding rod of the welding torch 104 which is equal to D.

The sprocket gear 202 rotates through two full revolutions each time the sprocket gear 218 rotates through one revolution. This means that during each revolution of the sprocket gear 218, and hence of the work piece constituted by two metal objects, the T-shaped block 206 and the pin 172 will act through the adjustable-length link 182, the generally-triangular plate 178, the adjustable-length link 188, and the elongated, angular, pivoted support 84 to cause the welding torch 104 to successively move in the counterclockwise direction, in the clockwise direction, again in the counterclockwise direction, and again in the clockwise direction. In doing so, that T-shaped block and pin will perform the functions that normally are performed by the cam 60, the cam follower 170, and the elongated arm 154. Where a large number of identical work pieces are to be welded, it usually will be desirable to design or obtain a 60 which has the required rises and falls incorporated therein. However, where only a limited number of identical work pieces are to be welded, it usually is sufficient to connect the adjustable-length link 182 to the T-shaped block 206 and to use the threaded rods 208 to provide the desired movement D of the welding torch 104. The adjustable-length link 182 preferably will have self-aligning bearings in the ends thereof to accommodate the tilting of the axis of that adjustable-length which will occur as the pin 172 is moved eccentrically of the axis of the sprocket gear 202.

FIGS. 12 and 13 show the TORCH PIVOT CENTER at the axis of the metal tube 288; and such an arrangement is desirable where the tip of the welding rod of the welding torch 104 should move axially of that metal tube. However, there are welding jobs where it is desirable to change the angle of the axis of the welding rod of the welding torch 104 without producing axial movement of the tip of that welding rod. In such an instance, a cam 62 will be selected which will cause the axis of the tubular spacer 81 of the pivot mounting 74 to abut the edge of the work piece, as indicated in FIG. 14. That axis is denoted by a small cross and the notation TORCH PIVOT CENTER, and that edge is denoted by a line and the numeral 314. As indicated by the arrows in FIG. 14, such an arrangement will enable the axis of the welding rod of the welding torch 104 to be swung back and forth relative to the edge 314 and yet leave the tip of that welding rod at the TORCH PIVOT CENTER.

Some welding jobs must be performed on pieces of metal which could interfere with the welding torch 104 as those pieces were rotated by the work-supporting fixtures therefor. In such an instance, any such interference might be avoided by displacing the TORCH PIVOT CENTER rearwardly of the tip of the welding rod of the welding torch 104. In FIG. 15, the axis of the tubular spacer 81 of the pivot mounting 74 is denoted by a small cross and the notation TORCH PIVOT CENTER and an edge of a metal piece is denoted by a line and the numeral 316. As indicated by the arrows in FIG. 15, rotation of the axis of the welding rod of the welding torch 104 about the TORCH PIVOT CENTER provides substantial movement of the tip of that welding rod longitudinally of the edge 316; and such substantial movement could move the welding torch 104 out of the path of an otherwise-interfering portion of a metal piece.

The welding torch 104 can be the standard and usual type of welding torch which is used in MIG welding, or it can be the standard and usual type of welding torch which is used in TIG welding. Such welding torches and the accessory equipment associated with them are well known to those skilled in the art and need not be shown or described herein. If desired, of course, special MIG welding torches, special TIG welding torches, or other forms of welding torches could be used.

The welding machine provided by the present invention is not restricted to the welding of metal objects. Instead, that welding machine could be used to weld non-metallic objects such as objects of plastic material. To weld non-metallic plastic objects, the welding torch 104 would be replaced by a heat-supplying unit which would provide concentrated heat, in the form of hot air or otherwise, at the junction between the non-metallic plastic objects. Furthermore, the welding machine provided by the present invention could be used to provide programmed cutting of metal objects or of other objects. Where that welding machine was used to provide controlled cutting of metal objects, the welding torch 104 would be replaced by an oxy-acetylene cutting torch. Consequently, as used in the appended claims, the phrase "welding torch" is intended to comprehend welding torches, cutting torches, and heat-supplying units which provide concentrated heat, in the form of hot air or otherwise.

Except for the motor 236, the gear housing 238, and the output shaft 239, the moving parts and controls within the prismatic enclosure 44 are duplicated by corresponding moving parts and controls within the prismatic enclosure 48. Further, the pivot mounting 242 and the elongated, angular, pivoted support 244 are duplicates of the pivot mounting 74 and of the elongated, angular, pivoted support 84. Consequently, the welding machine provided by the present invention can form two axially-spaced welds on the same work piece during a given welding cycle. Importantly, the cams 64 and 66 can be distinctively different from the cams 62 and 60, respectively; and, consequently, two entirely different kinds of junctions can be welded during a given welding cycle of the welding machine.

The pivot mountings 74 and 242 are disposed at desired distances from each other and from the confronting walls of the prismatic enclosures 44 and 48. The link 138 of FIGS. 3–6 determines the distance between the pivot mounting 74 and the inner wall of the prismatic enclosure 44; and a similar link, not shown, determines the distance between the pivot mounting 242 and the inner wall of the prismatic enclosure 48. By selecting links of the desired length, the operator of the welding machine can dispose the pivot mountings 74 and 242 at any desired positions along the length of the pivot 70.

Whenever the pivot mounting 74 and the pivot mounting 242 are shifted from the positions shown by FIG. 1, the cams 62 and 64 also will be shifted from the positions shown in FIG. 1—so those cams will continue to be in register with the cam follower 108 of the pivot mounting 74 and with the corresponding cam follower of the pivot mounting 242. In addition, the potentiometer 190 and its triangular base 189 will have to be shifted from the position of FIG. 1 to keep the actuator 192 thereof in register with the cam 62. Suitable slots could be provided in the horizontally-directed portion 28 of the metal plate to permit shifting of that potentiometer and its triangular base parallel to the shaft 56; or, alternatively, a track could be provided atop that horizontally-directed portion to permit ready shifting of that potentiometer and its triangular base parallel to that shaft. Shifting of the pivot mountings 74 and 242 parallel to the shaft 70 will not cause any binding between those pivot mountings and the T-shaped bar 41, because the rollers 126 and 130 and their counterparts will permit ready shifting of those pivot mountings relative to that T-shaped bar.

Whenever a longer or shorter link is substituted for the link 138 of FIGS. 3–6, a correspondingly longer or shorter adjustable-length link will be substituted for the adjustable-length link 188 in FIGS. 1, 3 and 5. Similarly, whenever a longer or shorter link is substituted for the counterpart of the link 138, a correspondingly longer or shorter adjustable-length link will be substituted for the counterpart of the adjustable-length link 188. Such substitutions will shift the positions of the pivot mountings 74 and 242 axially of the pivot 70 without affecting the angular dispositions of the elongated, angular, pivoted supports 84 and 244 relative to those pivot mountings.

The fixtures 290 and 292 of FIGS. 1, 7 and 16 hold two metal objects while the junction between those metal objects is being welded. However, fixtures can be made which will hold three objects while junctions between those objects are being welded. Thus, as shown by FIGS. 17–19, fixtures 320 and 326 can hold a square tube 324, a channel 344, and an angle 346 while the welding machine of the present invention welds junctions between that channel and that square tube and angle. Specifically, those fixtures hold that square tube, that channel and that angle while a junction between a pre-cut end of that channel and two sides of that square tube is being welded and while a junction between one flange of that channel and one end of that angle is being welded. It will be noted that the weld between the pre-cut end of the channel 344 and the two sides of the square tube is distinctively different from the weld between one flange of that channel and one end of the angle 346. To provide such distinctively-different welds, it is only necessary to secure a welding torch 348 to the flat plate 248 of FIG. 1, to substitute the fixture 320 for the fixture 290, to substitute the fixture 326 for the fixture 292, to design or obtain appropriately-shaped cams 60, 62, 64 and 66, and to appropriately set various limit switches adjacent the cam, not shown, within the prismatic enclosure 44.

The fixture 320 has a V-shaped recess in the free end thereof to accommodate portions of two sides of the square metal tube 324; and pins 322 are disposed within that recess to limit axial movement of that square metal tube. The fixture 326 has three guiding projections 328 in the form of pins which extend upwardly from that fixture to abut the flanges of the channel 344. Pivot blocks 330 extend upwardly from the fixture 326 to support a shaft 332 on which are mounted arcuate clamping fingers 334 and 336 and a crank arm 338. As indicated particularly by FIG. 17, the clamping finger 334 presses one end of one flange of the angle 346 downwardly into engagement with an abutment 333 on the fixture 326; and the clamping finger 336 presses the web of the channel 344 downwardly into engagement with the upper surface of that fixture. The numeral 340 denotes a spring-returned pneumatic cylinder which depends downwardly from the fixture 326, but which is pivotally secured to that fixture by a pivot 341. The upper end of the piston of that cylinder has a clevis-like connector 342 thereon; and a pin extends through openings in that connector and through the crank arm 338 to enable movement of that piston to rotate the clamping fingers 334 and 336. If additional guiding or supporting surfaces for the channel 344 or for the angle 346 were to be found necessary, they could easily be provided by the designer of the fixture 326.

A cam 62 will be designed or obtained which will cause the axis of the tubular spacer 81 of the pivot mounting 74 to pass through the web of the channel 344 whenever that channel is in the position of FIG. 17. That cam also will have falls thereon which will enable the tip of the welding rod of the welding torch 104 to gradually move toward the axis of the channel 344 during the major portion of the first quarter-revolution of that channel, to again gradually move toward that axis during the major portion of the second quarter-revolution of that channel, and to once again gradually move toward that axis during the major portion of the third quarter-revolution of that channel. During the latter portions of those quarter-revolutions, rises on the cam 62 will move the tip of the welding rod of the welding torch 104 away from the axis of the channel 344. Those falls and rises will enable that tip to closely follow the surfaces of the adjacent flange, of the web, and of the other flange of that channel as that channel is rotated about its axis. A cam 60 will be designed or obtained which will cause the axis of the welding rod of the welding torch 104 to swing between a horizontal angle which is displaced about 45° from the axis of the channel 344 and a horizontal angle which is displaced about 67° from that axis as the channel 344 is rotated about its axis. Because the axis of the tubular spacer 81 of the pivot mounting 74 passes through the web of the channel 344 whenever that channel is in the position of FIG. 17, such swinging of the axis of that welding rod will cause the tip of that welding rod to move axially of that channel. Proper design of the cams 60 and 62 will cause the tip of the welding rod of the welding torch 104 to track the junction between the pre-cut end of the channel 344 and the two adjacent sides of the square metal tube 324, while holding the axis of that welding rod close to the bisectors of the horizontal angles subtended by the adjacent surfaces of that channel and of that square metal tube.

The roller 196 of the actuator 192 of the potentiometer 190 will follow the rises and falls of the cam 62; and it will cause that potentiometer to vary the speed of rotation of square tube 324 and channel 344. Those variations in speed will cause the relative speed between the welding rod of the welding torch 104 and the junction between the square tube 324 and the channel 344 to be generally constant.

The cam 64 must have a fall thereon which will gradually permit the welding torch 348 to move toward the axis of the channel 344 during the major portion of the first quarter-revolution of that channel; and it must have a large rise thereon which will, shortly after the end of that first quarter-revolution of that channel, move that welding torch out of the path of the fixture 326. That cam will initially dispose the TORCH PIVOT CENTER of the welding torch 348 at that surface of that flange of the channel 344 which confronts that welding torch. The cam 66 will have a dwell thereon which will initially hold the axis of the welding rod of the welding torch 348 at the horizontal angle indicated by FIG. 17. That cam will have a fall and a dwell thereon which will subsequently enable the axis of the welding rod of the welding torch 348 to shift to, and remain in, a position which is closer to the axis of the channel 344 and which is displaced only about 45° from that axis. Switches, not shown, within the prismatic enclosure 44 will be set to cause compressed air to be supplied at appropriate times to the ports of the double-acting pneumatic cylinder which is the counterpart of the cylinder 140.

To load the square metal tube 324, the channel 344, and the angle 346 into the welding machine, the operator will dispose one of the apices of that square metal tube in the V-shaped recess of the fixture 320, and will position that square metal tube between the pins 322. Thereafter, he will insert the channel 344 between the guiding projections 328 so the pre-cut end of that channel will intimately abut portions of the two adjacent sides of that square metal tube, and will thereby hold that square metal tube in position within the V-shaped recess in the fixture 320. Also, the operator will dispose the angle 346 so one end thereof abuts the adjacent flange of the channel 344, and so one end of one of the flanges of that channel overlies the abutment 333 on the fixture 326. At such time, the operator will press the start button; and the pressing of that button will enable compressed air to enter the lower port of the cylinder 340 and thereby cause the clamping fingers 334 and 336 to fixedly clamp the channel 344 and the angle 346 to the fixture 326. If the welding torches 104 and 348 were in retracted position at the time the square metal tube 324, the channel 344, and the angle 346 were assembled with the fixtures 320 and 326, the compressed air which was holding those welding torches in retracted position would be vented to the atmosphere, and compressed air would be applied to the lower port of the cylinder 112 and to the lower port of the counterpart cylinder of the pivot mounting 242 to cause those welding torches to move to the positions shown by FIG. 17. In those positions, those welding torches will hold the tips of the welding rods thereof above the level of the inner apex of the square metal tube 324.

Immediately after the clamping fingers 334 and 336 fixedly clamp the channel 344 and the angle 346 to the fixture 326, compressed air will be applied to the inner port of the cylinder which is the counterpart of the cylinder 140; and that compressed air will cause the counterpart of the link 138 to shift the pivot mounting 242 toward the inner wall of the prismatic enclosure 48 in a direction parallel to the axis of the channel 344.

That movement will cause the elongated, angular, pivoted support 244 to move toward that wall of that prismatic enclosure without changing the horizontal angle of the axis of the welding rod of the welding torch 348. The cam follower of the pivot mounting 242, which is the counterpart of the cam follower 108, is long enough to permit such movement of the pivot mounting 242 without permitting that cam follower to move out of engagement with the peripheral face of the cam 64. The sideways movement of the pivot mounting 242, and the concomitant sideways movement of the elongated, angular, pivoted support 244, will cause the tip of the welding rod of the welding torch 348 to move to a point immediately adjacent the right-hand end of the junction between the end of the angle 346 and the adjacent flange of the channel 344.

At this time, welding current will be supplied to the welding torch 348; and the compressed air which was applied to the inner port of the counterpart of cylinder 140 will be vented to the atmosphere, and compressed air will be applied to the outer port of that cylinder. Thereupon, that cylinder and the counterpart of link 138 will start moving the pivot mounting 242, the elongated, angular pivoted support 244, and the welding torch 348 axially of the channel 344. An adjustable flow control which is associated with the counterpart of cylinder 140 will cause the welding torch 348 to move along the junction between the upper flange of the angle 346 and the adjacent flange of the channel 344 at a rate which will facilitate the formation of a strong, smooth weld at that junction. As the tip of the welding rod of the welding torch 348 approaches the left-hand edge of the upper flange of the angle 346, the motor 236 will start rotating the fixtures 320 and 326 in the direction indicated by the arrows in FIGS. 17 and 18. Simultaneously, welding current will be supplied to the welding torch 104; and that welding torch will start to form a weld at the junction between the square tube 324 and the channel 344. Both welding torches 104 and 348 will form welds during the major portion of the first quarter-revolution of the channel 344; and, during that major portion of that one-quarter revolution of that channel, both of those welding torches will gradually move toward the axis of that channel. During that major portion of that quarter-revolution of the channel 344, the horizontal angular position of the axis of the welding rod of the welding torch 348 will remain unchanged; but the axis of the welding rod of the welding torch 104 will initially swing in one direction horizontally and then subsequently swing back in the opposite direction horizontally in response to the changing periphery of the cam 60. Such swinging will enable the axis of that welding rod to be close to the bisector of the horizontal angles subtended by the adjacent surfaces of the channel 344 and of the square metal tube 324.

Shortly before the end of that first quarter-revolution of the channel 344, the flow of welding current to the welding torch 348 will be discontinued; and a rise on the cam 64 will cause the pivot mounting 242 to rotate the elongated, angular, pivoted support 244, and hence the welding torch 348, away from the axis of the channel 344. The movement of that welding torch will be extensive enough to move that welding torch completely out of the path of all portions of the fixture 326. Welding current will continue to be supplied to the welding torch 104 until the full length of the junction between the channel 344 and the square metal tube 324 has been welded. Shortly before and shortly after the end of the first, second and third quarter-revolutions of the channel 344, the cam 62 will cause the welding torch 104 to move away from the axis of that channel; but, during the major portions of those quarter-revolutions, that cam will permit that welding torch to move toward that axis. During the major portion of the second quarter-revolution of the channel 344, the horizontal angular position of the axis of the welding rod of the welding torch 104 will remain unchanged; but, during the major portion of each of the first and third quarter-revolutions of the channel 344, the axis of that welding rod will rotate in one direction about the axis of the tubular spacer 81 of the pivot mounting 74, and then subsequently rotate in the opposite direction about that axis. The overall result is that the tip of the welding rod of the welding torch 348 will track the junction between the angle 346 and the channel 344 while the axis of that welding rod is close to the bisectors of the angles subtended by the adjacent surfaces of that angle and channel; and the tip of the welding rod of the welding torch 104 will track the junction between the square metal tube 324 and the channel 344 while the axis of that welding rod is close to the bisectors of the angles subtended by the adjacent surfaces of that square metal tube and channel.

As the end of the junction between the channel 344 and the square metal tube 324 reaches the tip of the welding rod of the welding torch 104, the flow of welding current to that welding torch will be discontinued; but the motor 326 will continue to rotate the fixtures 320 and 326 until those fixtures reach the positions of FIG. 17. When those fixtures reach those positions, a limit switch within the prismatic enclosure 44 will vent to the atmosphere the compressed air which had been applied to the lower port of the cylinder 340. Thereupon, the returning spring within that cylinder will move the clamping fingers 334 and 336 upwardly out of engagement with, and out of the path of, the channel 344 and of the angle 346. At such time, the finished work piece can be removed from the fixtures 320 and 326.

FIGS. 17–19 thus show that the welding machine of FIG. 1 can, during a cycle of that welding machine, form two axially-displaced, distinctively-different welds. Moreover, FIGS. 17–19 show that the axes of the welding rods of the welding torches can be held close to the bisectors of the horizontal angles which are defined by the adjacent surfaces of the work piece even though the tips of those welding torches must be moved axially and radially of the axis of rotation of the work piece.

Figure 20:
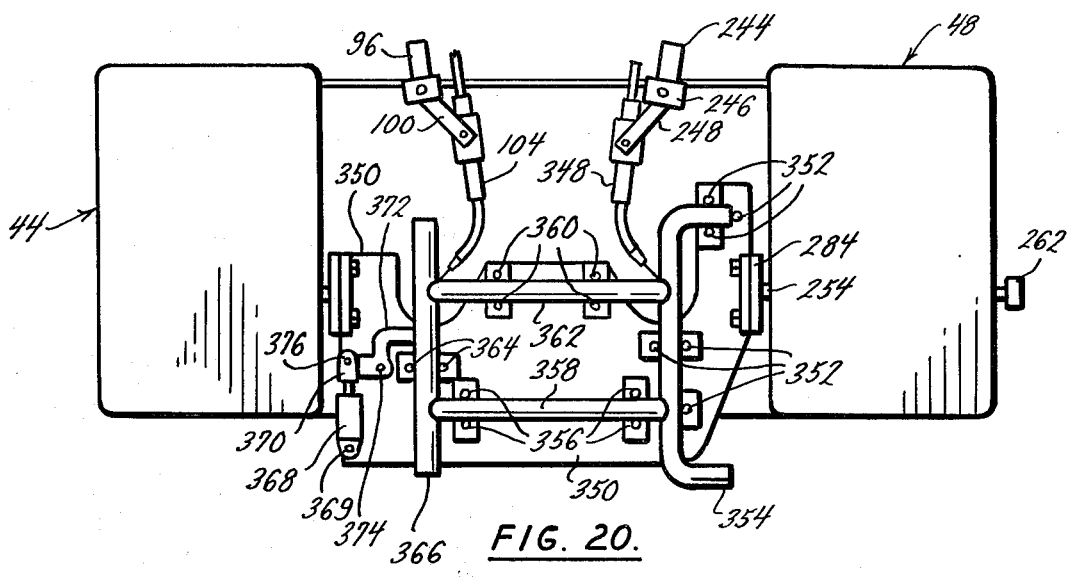
FIG. 20 is a plan view, on the scale of FIG. 2, of yet another set of work-supporting fixtures for the welding machine of FIG. 1.
Figure 21:
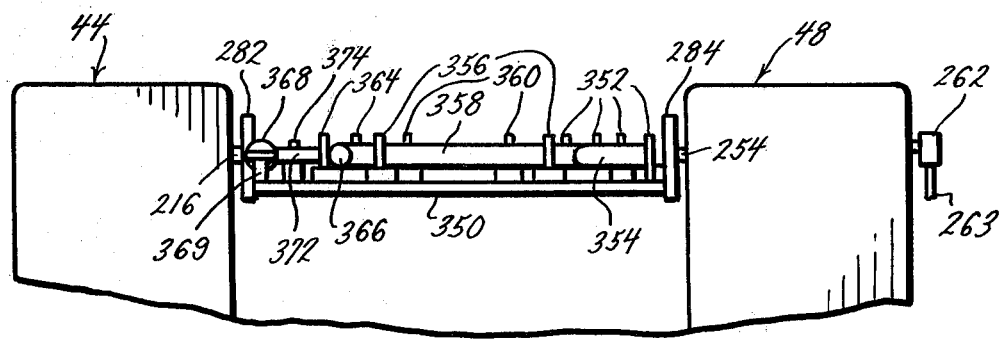
FIG. 21 is a front elevational view, on the scale of FIG. 2, of the set of work-supporting fixtures of FIG. 19.

Referring to FIGS. 20 and 21, the numeral 350 denotes a fixture which is securable to both of the face plates 282 and 284 of the welding machine of FIG. 1; and that fixture is a generally-flat plate which has two concave notches at one edge thereof. Six pin-like guiding projections 352 extend upwardly from rectangular spacing blocks that are secured to the upper surface of that fixture; and those guiding projections are arranged to accommodate a metal tube 354 which is bent in the form of a wide U. Four pin-like guiding projections 356 extend upwardly from further rectangular spacing blocks that are secured to the upper surface of the fixture 350; and those guiding projections are arranged to accommodate a straight tube 358. Four pin-like guiding projections 360 extend upwardly from other rectangular spacing blocks which are secured to the upper surface of the fixture 350; and those guiding projections are arranged to accommodate a straight tube 362. Two pin-like guiding projections 364 extend upwardly from yet another rectangular spacing block which is secured to the upper surface of the fixture 350, and those guiding projections are arranged to accommodate a straight tube 366. Both ends of each of the straight tubes 358 and 362 are pre-cut to be complementary to the confronting surfaces of the tubes 354 and 366.

The numeral 368 denotes a spring-returned pneumatic cylinder which is secured to the fixture 350 by a pivot 369; and a clevis-like connector 370 is mounted on the free end of the piston of that cylinder. A clamp 372 is rotatably secured to the fixture 350 by a pivot 374; and one end of that clamp is secured to the clevis-like connector 370 by a pin 376. As indicated particularly by FIG. 21, the free end of that clamp has a V-shaped recess which is movable into engagement with the left-hand side of the tube 366.

Whenever the fixture 350 is in the loading and unloading position of FIGS. 20 and 21, the returning spring within the cylinder 368 will hold the clamp 372 in its retracted position. To load that fixture, the operator of the welding machine will place a tube 354 in the position shown by FIG. 20, will place tubes 358 and 362 in the positions shown by FIG. 20 with the pre-cut right-hand ends thereof abutting the left-hand surface of the tube 354, and will place a tube 366 in engagement with the pre-cut left-hand ends of the tubes 358 and 362. Thereafter, when that operator presses the start button, compressed air will be applied to the port of the cylinder 368. Thereupon, the piston of that cylinder will act through the clevis-like connector 370 and the pin 376 to force the recessed end of that clamp into engagement with the left-hand side of the tube 366. The force which the clamp 372 will apply to the tube 366 will assure intimate engagement between the tubes 354, 358, 362 and 366, and also will help the guiding projections 352, 356, 360 and 364 to hold those tubes in assembled relation with the fixture 350.

The cams 60 and 66 will be designed or selected so the welding torches 104 and 348 will have the axes of the welding rods thereof close to the bisectors of the various angles which will be subtended by the adjacent surfaces of the tube 362 and of the tubes 354 and 366—all as explained hereinbefore in connection with the welding of the metal tube 288 to the metal tube 286.

Almost immediately after the operator presses the start button, the motor 236 will start rotating the fixture 350 in a direction opposite to the direction indicated by the arrows in FIGS. 20 and 21; and that motor will rotate that fixture in that direction until the axis of the tube 366 is displaced about 150° from the position of FIGS. 20 and 21. At such time, welding current will automatically be supplied to the welding torches 104 and 348, and the motor 236 will be reversed to cause the fixture 350 to start rotating in the direction indicated by the arrows in FIGS. 20 and 21. Those welding torches will continuously weld the junctions between the tube 362 and the tubes 354 and 366 while that fixture is rotated to and through the position shown by FIGS. 20 and 21 and until that fixture has rotated a total of about three hundred degrees. Thereafter, the flow of welding current to the welding torches 104 and 348 will be halted, and the motor 236 will again rotate in the direction opposite to the direction shown by the arrows in FIGS. 20 and 21 until the fixture 350 again reaches its loading and unloading position. Thereupon, the compressed air which causes the cylinder 368 to hold the clamp 372 in engagement with the tube 366 will be vented to the atmosphere, and the returning spring within that cylinder will cause the piston to move that clamp away from the tube 366. During the 300° rotation of the fixture 350 in the direction shown by the arrows in FIGS. 20 and 21, the cams 60 and 66 will cause the axes of the welding rods of the welding torches 104 and 348 to swing through horizontal angles. The rises and falls in those cams will cause the tips of those welding rods to track the junctions between tube 362 and the tubes 354 and 366; and they will also cause the axes of those welding rods to be close to the bisectors of the horizontal angles defined by the adjacent surfaces of those tubes.

The horizontal position of the fixture 350 which is shown by FIGS. 20 and 21 is a desirable position for loading and unloading that fixture; but it would be impossible to provide continuous welds, at the junctions between the tube 362 and the tubes 354 and 366, which had angular extents of 300°, if such welds were started while that fixture was in that position. To enable the welds at the junctions between the tube 362 and tubes 354 and 366 to be continuous and to have angular extents of 300°, the welding machine initially rotates the fixture 350 approximately 150° in the direction opposite to the direction indicated by the arrows in FIGS. 20 and 21, supplies current to the welding torches 104 and 348, and then rotates that fixture a full 300° in the direction indicated by those arrows.

After welds have been developed at the junctions between the tube 362 and the tubes 354 and 366, those tubes will be removed, respectively, from the guiding projections 360, 352 and 364. Thereupon, the tube 358 will be disposed between the guiding projections 360 and the tubes 354 and 366 will again be held, respectively, by the guiding projections 352 and 364. At such time, the start button of the welding machine will again be pressed to initiate the welding of the junctions between the tube 358 and the tubes 354 and 366.

In most instances, welds that have angular extents of 300° will be able to provide sufficiently strong and sufficiently sturdy joints between the tube 358 and the tubes 354 and 366 and between the tube 362 and the tubes 354 and 366. However, in the event full 360° welds were required at the junctions between each of the tubes 358 and 362 and the tubes 354 and 366, the work piece would be inverted, and then two cycles of the welding machine would be employed to provide welds at the remaining 60° angular extents of those junctions. At the ends of those two cycles of the welding machine, the finished work piece would be removed from the fixture 350. Although an ejection mechanism is not needed with that fixture, or with either of the fixtures 292 and 326, any or all of those fixtures could be equipped with such a mechanism.

As pointed out hereinbefore, where two objects of circular cross section are to be welded so the axes thereof are spaced by 90°, and where those objects are to be rotated about the axis of one of them, the cam 62 can be circular in form and can be mounted concentrically on the shaft 56, the radius of that cam will be selected to cause the axis of the tubular spacer 81 of the pivot mounting 74 to pass through or close to the axis of that one object, and an oval cam 60 or the plate 204, the T-shaped block 206 and the threaded rods 208 can be used to swing the axis of the welding rod of the welding torch 104 through the desired horizontal angles. Also, as pointed out hereinbefore, where two objects of polygonal cross sections are to be welded so the axes thereof are spaced apart by 90°, where those objects are to be rotated about the axis of one of them, and where the surfaces of the other of them define planes which are not parallel to that axis, the cam 60 and the cam 62 will have appropriate rises and falls thereon. Further, as pointed out hereinbefore, where two objects of polygonal cross section are to be welded so the axes thereof are spaced apart by 90°, where those objects are to be rotated about the axis of one of them, and where at least one surface of the other of them defines a plane which is parallel to that axis, the cam 60 and the cam 62 will have appropriate rises and falls thereon and the cylinder 140 will provide movement of the welding torch parallel to that one surface of that other object. Where an object of polygonal cross section is to be welded to an object of circular cross section while the axes of those objects are spaced apart 90°, where those objects are to be rotated about the axis of the object of circular cross section, and where one surface of the object of polygonal cross section defines a plane which is parallel to that axis, both cams 60 and 62 can be circular in form and can be mounted concentrically on the shaft 56, and the cylinder 140 will provide movement of the welding torch parallel to that one surface of that object of polygonal cross section. Where an object of polygonal cross section is to be welded to a flat plate so the axis of that object is displaced 90° from the surface of that plate, and where that object and plate are to be rotated about the axis of that object, the cam 60 can be circular in form and can be mounted concentrically on the shaft 56, but the cam 62 will have appropriate rises and falls thereon. Where two objects of circular cross section are to be welded so the axes thereof are spaced apart by an acute or obtuse angle, and where those objects are to be rotated about the axis of one of them, the cam 62 can be circular in form and can be mounted concentrically on the shaft 56, the radius of that cam will be selected to cause the axis of the tubular spacer 81 of the pivot mounting 74 to pass through or close to the axis of that one object, and an oval cam 60 can be used to swing the axis of the welding rod of the welding torch 104 through the desired horizontal angles. Where an object of circular cross section is to be welded to a flat plate so the axis of that object is displaced 90° from the surface of that plate and where that object and plate are to be rotated about the axis of that object, both of the cams 60 and 62 can be circular in form and can be mounted concentrically on the shaft 56. Where an object of circular cross section is to be welded to a flat plate so the axis of that object is displaced from the surface of that plate by an acute or obtuse angle, and where that object and plate are to be rotated about the axis of that object, the cam 62 can be circular in form and can be mounted concentrically on the shaft 56, but the cam 60 will have appropriate rises and falls thereon. Where an object of circular cross section is to be welded to a flat plate so the axis of that object is displaced from the surface of that plate by an acute or obtuse angle, and where that object and plate are to be rotated about an axis which is normal to the surface of that plate, the cam 60 can be circular in form and can be mounted concentrically on the shaft 56 but the cam 62 will have appropriate rises and falls thereon.

In view of all the foregoing, it should be apparent that the welding machine of the present invention can form strong, smooth welds of many distinctively-different sizes and configurations. Importantly, that welding machine can, while forming such welds, avoid undercutting of the abutting portions of the objects that are being welded, and also avoid the forming of unduly thick deposits of weld material on either of those abutting portions. Furthermore, that welding machine can simultaneously form two axially-displaced, distinctively-different welds. That welding machine is able to accomplish these desirable results even though it utilizes only a limited number of components.

In most instances, any given 180° of the periphery of the cam 62 will be a duplicate of the remaining 180° of the periphery of that cam; and hence the cam follower 196, which is carried by the actuator 192 of the potentiometer 190, and the cam follower 108, which is carried by the pivot mounting 74, will simultaneously "see" equal rises, dwells and falls. Consequently, even though the cam follower 196 is displaced 180° of the periphery of the cam 62 from the cam follower 108, the potentiometer 190 is able to vary the speed of the motor 236 in accordance with the rises, dwells and falls "seen" by the cam follower 108.

In the event it ever became desirable to use a cam 62 which had any 180° of the periphery thereof distinctively different from the remaining 180° of the periphery of that cam, a duplicate cam, which had the periphery thereof displaced 180° from the periphery of the cam 62, would be mounted on the shaft 54 a short distance away from the cam 62. Also, the potentiometer 190 and its triangular base 189 would be moved into register with that duplicate cam.

Whereas the drawing and accompanying description have shown and described a preferred embodiment of the present invention, it should be apparent to those skilled in the art that various changes may be made in the form of the invention without affecting the scope thereof.

What I claim is:

1. A welding machine which has rotatable work-supporting means that can rotate work about a given axis while a welding operation is being performed on said work, a pivot, a movable mounting for said pivot which holds the axis of said pivot so it extends transversely of said given axis and which can be moved during said welding operation to dynamically move said axis of said pivot radially relative to said given axis, a position-changing member for said mounting for said pivot which is rotatable about a further axis, that extends transversely of said pivot, and which can move said pivot mounting during said welding operation, a support for a welding torch that is supported by and is rotatable about said pivot during said welding operation to dynamically rotate said welding torch about said pivot, said support for said welding torch moving with said pivot whenever said position-changing member for said pivot mounting causes said pivot mounting to move said pivot radially relative to said given axis, whereby said pivot mounting can hold said pivot, and hence said welding torch, adjacent rotating work held by said rotatable work-supporting means and also can change the radial position of said axis of said pivot, and hence of said welding torch, relative to said given axis during said welding operation, driving means to rotate said rotatable work-supporting means and thereby provide relative movement between said support for said welding torch and said rotatable work-supporting means and hence to provide relative movement between said welding torch and said rotating work, and thereby enable said welding torch to confront a predetermined relatively-moving surface of said rotating work, and support-moving means that includes a mechanical linkage connected to said support, said linkage engaged by a rotatable member which is rotatable during said welding operation to move said support for said welding torch about said pivot and thereby cause said welding torch to rotate about said pivot and hence to move angularly relative to said work-supporting means, said driving means also rotating said rotatable member of said support-moving means, said position-changing member for said pivot mounting being adapted to coact with said support-moving means, during the time said driving means is providing said relative movement between said welding torch and said rotating work, to dynamically vary the angular position of said support for said welding torch, and hence of said welding torch, relative to said predetermined surface of said rotating work and also to dynamically vary the radial position of said pivot, and hence of said welding torch, relative to said given axis in a predetermined manner, whereby a weld can be formed at said predetermined surface of said rotating work without undercutting any portion of said rotating work.

2. A welding machine which has rotatable work-supporting means that can rotate work about a given axis while a welding operation is being performed on said work, a support for a welding torch that includes a pivot about which said welding torch can rotate and that can hold said pivot and hence said welding torch adjacent rotating work held by said rotatable work-supporting means and that also can change the radial position of said pivot and hence of said welding torch relative to said axis during said welding operation, driving means to rotate said rotatable work-supporting means and thereby provide relative movement between said support for said welding torch and said rotatable work-supporting means and hence to provide relative movement between said welding torch and said rotating work, and thereby enable said welding torch to confront a predetermined relatively-moving surface of said rotating work, support-moving means adapted to move said support for said welding torch to cause said welding torch to rotate about said pivot and hence to move angularly relative to said work-supporting means and also to change the radial position of said welding torch relative to said axis and hence relative to said work-supporting means, during the time said driving means is providing said relative movement between said welding torch and said rotating work, to dynamically vary the angular position of said welding torch relative to said predetermined surface of said rotating work and to dynamically vary the radial position of said pivot and hence of said torch relative to said axis in a predetermined manner, whereby a weld can be formed at said predetermined surface of said rotating work without undercutting any portion of said rotating work, a stationary barrier disposed between said work-supporting means and said support-moving means which will keep weld spatter, that will develop during the welding of said rotating work held by said work-supporting means, from reaching said support-moving means.

3. A welding machine as claimed in claim 1 wherein said support-moving means can cause said support for said welding torch to rotate said welding torch in a plane that is generally parallel to said given axis of said rotating work.

4. A welding machine as claimed in claim 1 wherein said support-moving means can cause said support for said welding torch to rotate said welding torch in a plane that is generally parallel to said given axis of said rotating work, wherein said support-moving means can cause said support for said welding torch to rotate said welding torch in said plane that is generally parallel to said given axis of said rotating work while said position-changing member is causing said pivot mounting to move said pivot, and hence said support for said welding torch, radially relative to said given axis, and wherein said support-moving means can dynamically move said support for said welding torch, and hence said welding torch, parallel to said axis of said rotating work.

5. A welding machine as claimed in claim 1 wherein said predetermined surface of said rotating work coacts with an adjacent surface of said rotating work to subtend angles of varying angular extents, and wherein said support-moving means dynamically rotates said welding torch in a programmed manner about said given axis of said pivot which is transverse of said axis of said rotating work to hold the axis of the welding rod of said welding torch at predetermined positions within said subtended angles.

6. A welding machine as claimed in claim 1 wherein said support-moving means can cause said support for said welding torch to rotate said welding torch in a plane that is generally parallel to said given axis of said rotating work, wherein said predetermined surface of said rotating work coacts with an adjacent surface of said rotating work to subtend angles of varying angular extents, and wherein said support-moving means dynamically rotates said welding torch in a programmed manner about said axis of said pivot which is transverse of said given axis of said rotating work to hold the axis of the welding rod of said welding torch close to the bisectors of said subtended angles.

7. A welding machine which has work-supporting members that can hold and move a workpiece relative to a given axis while a welding operation is being performed on said workpiece, a pivot, a movable mounting for said pivot which holds the axis of said pivot so it extends transversely of said given axis but which can be moved during said welding operation to dynamically move said axis of said pivot toward and away from said given axis, a position-changing member for said mounting for said pivot which is rotatable about a further axis, that extends transversely of said pivot, and which can move said pivot mounting during said welding operation, a support for a welding torch that is supported by and that is rotatable about said pivot during said welding operation to dynamically rotate said welding torch about said pivot, said support for said welding torch moving bodily with said pivot whenever said position-changing member for said pivot mounting causes said axis of said pivot to move toward and away from said given axis, whereby said pivot mounting can dynamically change the radial position of said axis of said pivot, and hence of said welding torch, relative to said given axis in a programmed manner and thereby hold said welding torch adjacent radially-displaced surfaces of said workpiece while said workpiece is held and moved by said work-supporting members, driving members to move said work-supporting means and thereby provide movement of said radially-displaced surfaces of said workpiece relative to said welding torch, and thereby enable said welding torch to confront said predetermined relatively-moving radially-displaced surfaces of said workpiece, and support-moving members that includes a mechanical linkage connected to said support, said linkage engaged by a rotatable member which is rotatable during said welding operation to move said support for said welding torch about said pivot and thereby change the angular position of said welding torch, said position-changing member for said pivot mounting being adapted to change the radial position of said pivot, and hence of said welding torch, relative to said work-supporting members during the time said driving members are moving said workpiece relative to said welding torch, to dynamically vary the angular position of said support for said welding torch, and hence of said welding torch, relative to said predetermined surface of said workpiece, and to dynamically vary the radial position of said pivot, and hence of said welding torch, relative to said given axis in a predetermined manner, whereby a weld can be formed at said predetermined surface of said workpiece without undercutting any portion of said workpiece.

8. A welding machine as claimed in claim 7 wherein said work-supporting members rotate said workpiece about an axis of said workpiece, wherein said workpiece is acircular in cross section, and wherein a speed-controlling member is adapted to vary the speed of rotation of said work-supporting members in a programmed manner, and hence of said workpiece, to provide a generally constant rate of movement of said predetermined surface of said workpiece relative to said welding torch.

9. A welding machine as claimed in claim 7 wherein a support for a second welding torch can hold said second welding torch adjacent said work piece while said work piece is held and moved by said work-supporting members, wherein further support-moving members are adapted to dynamically move said support for said second welding torch relative to said work-supporting members, during the time said driving members are moving said work piece relative to the first said and said second welding torches, to vary the angular position of said second welding torch relative to a further predetermined surface of said work piece in a predetermined manner, whereby a weld can be formed at said further predetermined surface of said work piece without undercutting any portion of said work piece, and wherein the first said and said further support-moving members can simultaneously and dynamically move the first said and said second supports for said welding torches to different extents.

10. A welding machine as claimed in claim 7 wherein a support for a second welding torch can hold said second welding torch adjacent said work piece while said work piece is held and moved by said work-supporting members, wherein further support-moving members are adapted to dynamically move said support for said second welding torch relative to said work-supporting members, during the time said driving members are moving said work piece relative to the first said and said second welding torches, to dynamically vary the angular position of said second welding torch relative to a further predetermined surface of said work piece in a predetermined manner, whereby a weld can be formed at said further predetermined surface of said work piece without undercutting any portion of said work piece, and wherein the first said and said further support-moving members are disposable at different distances from each other to enable said welding torches to form welds at points on a work piece which are spaced apart different distances along an axis of said work piece.

11. A welding machine which has work-supporting members that can hold and move a workpiece, a support for a welding torch that can hold said welding torch adjacent said workpiece while said workpiece is held and moved by said work-supporting members, driving members to move said work-supporting members and thereby provide movement of a predetermined surface of said workpiece relative to said welding torch, and support-moving members adapted to move said support for said welding torch relative to said work-supporting members, during the time said driving members are moving said workpiece relative to said welding torch, to vary the angular position of said welding torch relative to said predetermined surface of said workpiece in a predetermined manner, whereby a weld can be formed at said predetermined surface of said workpiece, without undercutting any portion of said workpiece, said work-supporting members rotating said workpiece about an axis of said workpiece, said workpiece being acircular in cross section, a speed-controlling member that is adapted to vary the speed of rotation of said work-supporting members, and hence of said workpiece, in a programmed manner to provide a generally constant rate of movement of said predetermined surface of said workpiece relative to said welding torch, said support for said welding torch being movable to dynamically move said welding torch toward and away from said axis of said workpiece, and a cam that causes said support for said welding torch to move and thereby move said welding torch toward and away from said axis of said workpiece and also causes said speed-controlling member to vary the speed of rotation of said work-supporting members.

12. A welding machine as claimed in claim 7 wherein a cam establishes the initial position of said support for said welding torch relative to said axis of said workpiece and also causes said support for said welding torch to dynamically move and thereby dynamically move said welding torch toward and away from said axis of said workpiece.

13. A welding machine which has rotatable work-supporting means that can rotate a workpiece about a given axis, a support for a welding torch that includes a rotatable pivot and that can hold said welding torch adjacent a surface of said rotating workpiece held by said rotatable work-supporting means and that can move said welding torch toward and away from said axis, driving means to rotate said rotatable work-supporting means and thereby provide relative rotation between said support for said welding torch and said rotatable work-supporting means and hence to provide relative rotation between said welding torch and said surface of said rotating workpiece and thereby enable said welding torch to confront a predetermined relatively-rotating surface of said rotating workpiece, support-moving means adapted to move said support for said welding torch angularly relative to said axis and also to change the position of said pivot radially of said axis, during the time said driving means is providing said relative rotation between said welding torch and said rotating workpiece, to dynamically vary the angular position of said welding torch relative to said predetermined surface of said rotating workpiece and to dynamically vary the position of said pivot radially of said axis in a predetermined manner, said support for said welding torch being pivotable about a further axis so said support can move said pivot transversely of said axis of said workpiece, and said support for said welding torch responding to the insertion of different cams within said welding machine to selectively dispose the axis of said pivot forwardly of, adjacent, or rearwardly of said surface of said workpiece.

14. A welding machine as claimed in claim 7 wherein a rotatable cam is adapted to dynamically shift the position of the axis of said pivot relative to said given axis, and wherein said rotatable cam establishes an initial position of said axis of said pivot relative to said given axis and subsequently automatically and dynamically shifts said axis of said pivot relative to said given axis.

15. A welding machine which has work-supporting members that can hold and move a workpiece, a support for a welding torch that can hold said welding torch adjacent said workpiece while said workpiece is held and moved by said work-supporting members, driving members to move said work-supporting members and thereby provide movement of a predetermined surface of said workpiece relative to said welding torch, and support-moving members adapted to move said support for said welding torch relative to said work-supporting members, during the time said driving members are moving said workpiece relative to said welding torch, to vary the angular position of said welding torch relative to said predetermined surface of said workpiece in a predetermined manner, whereby a weld can be formed at said predetermined surface of said workpiece without undercutting any portion of said workpiece, said support for said welding torch being dynamically pivotable about an axis which is transverse of an axis of said workpiece, a cam that is adapted to dynamically shift the position of said first said axis relative to said axis of said workpiece, said cam establishing an initial position of said first said axis relative to said axis of said workpiece and subsequently dynamically shifting said first said axis relative to said axis of said workpiece, a speed-controlling member that is adapted to vary the speed of rotation of movement of said work-supporting members and hence of said workpiece, to provide a generally constant rate of movement of said predetermined surface of said workpiece relative to said welding torch, and said cam causing said speed-controlling member to dynamically vary the speed of movement of said work-supporting members.

16. A welding machine which has work-supporting members that can hold and move a workpiece, a support for a welding torch that can hold said welding torch adjacent said workpiece while said workpiece is held and moved by said work-supporting members, driving members to move said work-supporting members and thereby provide movement of a predetermined surface of said workpiece relative to said welding torch, and support-moving members adapted to move said support for said welding torch relative to said work-supporting members, during the time said driving members are moving said workpiece relative to said welding torch, to vary the angular position of said welding torch relative to said predetermined surface of said workpiece in a predetermined manner, whereby a weld can be formed at said predetermined surface of said workpiece without undercutting any portion of said workpiece, said support-moving members including a tiltable pivot mounting that pivotally holds said support for said welding torch, said tiltable pivot mounting being dynamically tiltable to tilt said support for said welding torch, and said support for said welding torch being dynamically pivotable relative to said tiltable pivot mounting, and said tiltable pivot mounting being shiftable sideways, whereby said support-moving members can dynamically provide universal movement of said support for said welding torch.

17. A welding machine which has work-supporting members that can hold and move a workpiece, a support for a welding torch that can hold said welding torch adjacent said workpiece while said workpiece is held and moved by said work-supporting members, driving members to move said work-supporting members and thereby provide movement of a predetermined surface of said workpiece relative to said welding torch, and support-moving members adapted to move said support for said welding torch relative to said work-supporting members, during the time said driving members are moving said workpiece relative to said welding torch, to vary the angular position of said welding torch relative to said predetermined surface of said workpiece in a predetermined manner, whereby a weld can be formed at said predetermined surface of said workpiece without undercutting any portion of said workpiece, said support-moving members including a tiltable pivot mounting that pivotally holds said support for said welding torch, a cam that is adapted to dynamically tilt said tiltable pivot mounting, a second cam that is adapted to dynamically pivot said support for said welding torch relative to said tiltable pivot mounting, and a piston and cylinder that are adapted to shift said tiltable pivot mounting sideways, whereby said support-moving members can dynamically provide universal movement of said support for said welding torch.

18. A welding machine which has work-supporting members that can hold and move a workpiece, a support for a welding torch that can hold said welding torch adjacent said workpiece while said workpiece is held and moved by said work-supporting members, driving members to move said work-supporting members and thereby provide movement of a predetermined surface of said workpiece relative to said welding torch, and support-moving members adapted to move said support for said welding torch relative to said work-supporting members, during the time said driving members are moving said workpiece relative to said welding torch, to vary the angular position of said welding torch relative to said predetermined surface of said workpiece in a predetermined manner, whereby a weld can be formed at said predetermined surface of said workpiece without undercutting any portion of said workpiece, said support-moving members including a member which is mounted for rotation about a predetermined axis and a second member which is mounted on the first said member but is shiftable to be eccentric of said predetermined axis, and threaded means adapted to shift said second member so it is eccentric of said predetermined axis.

19. A welding machine which has work-supporting members that can hold and move a workpiece, a support for a welding torch that can hold said welding torch adjacent said workpiece while said workpiece is held and moved by said work-supporting members, driving members to move said work-supporting members and thereby provide movement of a predetermned surface of said workpiece relative to said welding torch, and support-moving members adapted to move said support for said welding torch relative to said work-supporting members, during the time said driving members are moving said workpiece relative to said welding torch, to vary the angular position of said welding torch relative to said predetermined surface of said workpiece in a predetermined manner, whereby a weld can be formed at said predetermined surface of said workpiece without undercutting any portion of said workpiece, said support-moving members including a member which is mounted for rotation about a predetermined axis and a second member which is mounted on the first said member but is shiftable to be eccentric of said predetermined axis, threaded means adapted to shift said second member so it is eccentric of said predetermined axis, said support-moving members including a cam, and said support-moving members including a link which is selectively connectable to and driven by said second member of said cam.

20. A welding machine which has work-supporting members that can hold and move a workpiece relative to a given axis, a movable support for a welding torch that includes a pivot about which said welding torch can rotate dynamically and that can dynamically change the radial position of said pivot and hence of said welding torch relative to said axis in a programmed manner and thereby hold said welding torch adjacent radially-displaced surfaces of said workpiece while said workpiece is held and moved by said work-supporting members, driving members to move said work-supporting members and thereby provide movement of said radially-displaced surfaces of said workpiece relative to said welding torch, support-moving members adapted to change the angular position of said welding torch and the radial position of said pivot of said movable support for said welding torch relative to said work-supporting members, during the time said driving members are moving said workpiece relative to said welding torch, to vary the angular position of said welding torch relative to said predetermined surface of said workpiece and to vary the radial position of said welding torch relative to said axis in a predetermined manner, whereby a weld can be formed at said predetermined surface of said workpiece without undercutting any portion of said workpiece, and a stationary barrier interposed between said workpiece and said driving members and said support-moving members, said barrier isolating said driving members and said support-moving members from weld spatter which develops as said workpiece is welded.

21. A welding machine which has work-supporting members that can hold and move a workpiece relative to a given axis, a movable support for a welding torch that includes a pivot about which said welding torch can rotate dynamically and that can dynamically change the radial position of said pivot and hence of said welding torch relative to said axis in a programmed manner and thereby hold said welding torch adjacent radially-displaced surfaces of said workpiece while said workpiece is held and moved by said work-supporting members, driving members to move said work-supporting members and thereby provide movement of said radially-displaced surfaces of said workpiece relative to said welding torch, support-moving members adapted to change the angular position of said welding torch and the radial position of said pivot of said movable support for said welding torch relative to said work-supporting members, during the time said driving members are moving said workpiece relative to said welding torch, to vary the angular position of said welding torch relative to said predetermined surface of said workpiece and to vary the radial position of said welding torch relative to said axis in a predetermined manner, whereby a weld can be formed at said predetermined surface of said workpiece without undercutting any portion of said workpiece, and a stationary barrier interposed between said workpiece and said driving members and said support-moving members, said stationary barrier isolating said driving members and said support-moving members from weld spatter which develops as said workpiece is welded, said support for said welding torch being elongated and having one portion thereof isolated from said weld spatter by said stationary barrier and having another portion thereof extending around said stationary barrier into proximity to said workpiece.

22. A welding machine which has work-supporting members that can hold and move a workpiece relative to a given axis, a movable support for a welding torch that includes a pivot about which said welding torch can rotate dynamically and that can dynamically change the radial position of said pivot and hence of said welding torch relative to said axis in a programmed manner and thereby hold said welding torch adjacent radially-displaced surfaces of said workpiece while said workpiece is held and moved by said work-supporting members, driving members to move said work-supporting members and thereby provide movment of said radially-displaced surfaces of said workpiece relative to said welding torch, support-moving members adapted to change the angular position of said welding torch and the radial position of said pivot of said movable support for said welding torch relative to said work-supporting members, during the time said driving members are moving said workpiece relative to said welding torch, to vary the angular position of said welding torch relative to said predetermined surface of said workpiece and to vary the radial position of said welding torch relative to said axis in a predetermined manner, whereby a weld can be formed at said predetermined surface of said workpiece without undercutting any portion of said workpiece, and a cam adapted to dynamically pivot said support for said welding torch about said axis of said pivot, an elongated arm that has a cam follower intermediate the ends thereof which engages said cam, and said elongated arm being one of said support-moving members and acting to provide a mechanical advantage which enables a given rise on said cam to provide a multiplied movement of said support for said welding torch.

23. A welding machine which has work-supporting members that can hold and move a workpiece relative to a given axis, a movable support for a welding torch that includes a pivot about which said welding torch can rotate dynamically and that can dynamically change the radial position of said pivot and hence of said welding torch relative to said axis in a programmed manner and thereby hold said welding torch adjacent radially-displaced surfaces of said workpiece while said workpiece is held and moved by said work-supporting members, driving members to move said work-supporting members and thereby provide movement of said radially-displaced surfaces of said workpiece relative to said welding torch, support-moving members adapted to change the angular postion of said welding torch and the radial position of said pivot of said movable support for said welding torch relative to said work-supporting members, during the time said driving members are moving said workpiece relative to said welding torch, to vary the angular position of said welding torch relative to said predetermined surface of said workpiece and to vary the radial position of said welding torch relative to said axis in a predetermined manner, whereby a weld can be formed at said predetermined surface of said workpiece without undercutting any portion of said workpiece, and said work-supporting members having a loading position, said work-supporting members havng a weld-initiating position, said work-supporting members having a weld-terminating position, and said loading position being intermediate said weld-initiating position and said weld-terminating position.

24. A welding machine which has work-supporting members that can hold and move a workpiece relative to a given axis, a movable support for a welding torch that includes a pivot about which said welding torch can rotate dynamically and that can dynamically change the radial position of said pivot and hence of said welding torch relative to said axis in a programmed manner and thereby hold said welding torch adjacent radially-displaced surfaces of said workpiece while said workpiece is held and moved by said work-supporting members, driving members to move said work-supporting members and thereby provide movement of said radially-displaced surfaces of said workpiece relative to said welding torch, support-moving members adapted to change the angular position of said welding torch and the radial position of said pivot of said movable support for said welding torch relative to said work-supporting members, during the time said driving members are moving said workpiece relative to said welding torch, to vary the angular position of said welding torch relative to said predetermined surface of said workpiece and to vary the radial position of said welding torch relative to said axis in a predetermined manner, whereby a weld can be formed at said predetermined surface of said workpiece without undercutting any portion of said workpiece, and said work-supporting members having a loading position, said work-supporting members having a weld-initiating position, said work-supporting members having a weld-terminating position, and said work-supporting members being moved in one direction from said loading position to said weld-initiating position but being moved in the opposite direction from said loading position to said weld-terminating position.

25. A welding machine which has work-supporting members that can hold and move a workpiece relative to a given axis, a movable support for a welding torch that includes a pivot about which said welding torch can rotate dynamically and that can dynamically change the radial position of said pivot and hence of said welding torch relative to said axis in a programmed manner and thereby hold said welding torch adjacent radially-displaced surfaces of said workpiece while said workpiece is held and moved by said work-supporting members, driving members to move said work-supporting members and thereby provide movement of said radially-displaced surfaces of said workpiece relative to said welding torch, support-moving members adapted to change the angular position of said welding torch and the radial position of said pivot of said movable support for said welding torch relative to said work-supporting members, during the time said driving members are moving said workpiece relative to said welding torch, to vary the angular position of said welding torch relative to said predetermined surface of said workpiece and to vary the radial position of said welding torch relative to said axis in a predetermined manner, whereby a weld can be formed at said predetermined surface of said workpiece without undercutting any portion of said workpiece, and said work-supporting members including a fixture that has guiding projections thereon plus a piston and cylinder which move a confining element relative to said workpiece.

26. A welding machine which has movable work-supporting means that can hold and move a workpiece while a welding operation is being performed on said workpiece, a pivot, a movable mounting for said pivot which holds the axis of said pivot so it extends transversely of an axis of said workpiece and which can be moved during said welding operation to dynamically move said axis of said pivot relative to said axis of said workpiece, a position-changing member for said pivot mounting which is rotatable about a further axis, that extends transversely of said pivot, and which can move said pivot mounting during said welding operation, a support for a welding torch that is supported by and is rotatable about said pivot during said welding operation to dynamically rotate said welding torch about said pivot, said support for said welding torch moving with said pivot whenever said position-changing member for said pivot mounting causes said pivot mounting to move said pivot relative to said axis of said workpiece, whereby said pivot mounting can hold said welding torch adjacent a surface of said workpiece while said workpiece is held and moved by said movable work-supporting means and can move said welding torch toward and away from said axis of said workpiece during said welding operation, driving means to move said movable work-supporting means and thereby provide relative movement between said support for said welding torch and said movable work-supporting means and hence to provide relative movement between said welding torch and said surface of said workpiece and thereby enable said welding torch to confront a predetermined relatively-moving surface of said workpiece, and support-means that includes a rotatable member which is rotatable during said welding operation to move said support for said welding torch angularly relative to said axis of said workpiece about said pivot, said driving means also rotating said rotatable member of said support-moving means, said position-changing member for said pivot mounting being adapted to coact with said support-moving means, during the time said driving means is providing said relative movement between said welding torch and said workpiece, to dynamically vary the angular position of said welding torch relative to said predetermined surface of said workpiece and also to dynamically vary the position of said pivot radially of said axis of said workpiece in a predetermined manner, said position-changing member being adapted to dynamically dispose said pivot in various positions transversely of said axis of said workpiece to dynamically determine the positioning of the tip of said welding torch axially relative to said predetermined surface of said workpiece as said support-moving means dynamically varies said angular position of said welding torch relative to said predetermined surface of said workpiece.

27. A welding machine which has movable work-supporting means that can hold and move a workpiece while a welding operation is being performed on said workpiece, a pivot, a movable mounting for said pivot which holds the axis of said pivot so it extends transversely of an axis of said workpiece and which can be moved during said welding operation to dynamically move said axis of said pivot relative to said axis of said workpiece, a position-changing member for said pivot mounting which is rotatable about a further axis, that extends transversely of said pivot, and which can move said pivot mounting during said welding operation, a support for a welding torch that is supported by and is rotatable about said pivot during said welding operation to dynamically rotate said welding torch about said pivot, said support for said welding torch moving with said pivot whenever said position-changing member for said pivot mounting causes said pivot mounting to move said pivot relative to said axis of said workpiece, whereby said pivot mounting can hold said welding torch adjacent a surface of said workpiece while said workpiece is held and moved by said movable work-supporting means and can move said welding torch toward and away from said axis of said workpiece during said welding operation, driving means to move said movable work-supporting means and thereby provide relative movement between said support for said welding torch and said movable work-supporting means and hence to provide relative movement between said welding torch and said surface of said workpiece and thereby enable said welding torch to confront a predetermined relatively-moving surface of said workpiece, and support-moving means that includes a mechanical linkage connected to said support, said linkage engaged by a rotatable member which is rotatable during said welding operation to move said support for said welding torch about said pivot and thereby cause said welding torch to rotate about said pivot and hence to move angularly relative to said axis of said workpiece about said pivot, said driving means also rotating said rotatable member of said support-moving means, said position-changing member for said pivot mounting being adapted to coact with said support-moving means during the time said driving means is providing said relative movement between said welding torch and said workpiece, to dynamically vary the angular position of said support for said welding torch, and hence of said welding torch, relative to said predetermined surface of said workpiece and also to dynamically vary the position of said pivot, and hence of said welding torch, radially of said axis of said workpiece in a predetermined manner.

28. A welding machine as claimed in claim 27 wherein said predetermined surface of said workpiece has radially-displaced portions, wherein said position-changing member disposes the axis of said pivot in a given position relative to said axis of said workpiece whenever one of said radially-displaced portions of said predetermined surface of said workpiece confronts the tip of said welding torch, wherein said position-changing member automatically and dynamically disposes said axis of said workpiece whenever another of said radailly-displaced portions of said predetermined surface of said workpiece confronts said tip of said welding torch, and wherein said position-changing member automatically and dynamically makes the spacing between the tip of said welding torch and said one and said other of said radially-displaced portions of said predetermined surface of said workpiece substantially equal.

29. A welding machine which has movable work-supporting means that can hold and move a workpiece while a welding operation is being performed on said workpiece, a pivot, a movable mounting for said pivot which holds the axis of said pivot so it extends transversely of an axis of said workpiece and which can be moved during said welding operation to dynamically move said axis of said pivot relative to said axis of said workpiece, a position-changing member for said pivot mounting which is rotatable about a further axis, that extends transversely of said pivot, and which can move said pivot mounting during said welding operation, a support for a welding torch that is supported by and is rotatable about said pivot during said welding operation to dynamically rotate said welding torch about said pivot, said support for said welding torch moving with said pivot, whereby said pivot mounting can hold said welding torch adjacent a surface of said workpiece while said workpiece is held and moved by said movable work-supporting means and can move said welding torch toward and away from said axis of said workpiece during said welding operation, driving means to move said movable work-supporting means and thereby provide relative movement between said support for said welding torch and said movable work-supporting means and hence to provide relative movement between said welding torch and said surface of said workpiece and thereby enable said welding torch to confront a predetermined relatively-moving surface of said workpiece, and support-moving means that includes a mechanical linkage connected to said support, said linkage engaged by a rotatable member which is rotatable during said welding operation to move said support for said welding torch angularly relative to said axis of said workpiece about said pivot, said driving means also rotating said rotatable member of said support-moving means, said position-changing member for said pivot mounting being adapted to coact with said support-moving means, during the time said driving means is providing said relative movement between said welding torch and said workpiece, to dynamically vary the angular position of said support for said welding torch, and hence of said welding torch, relative to said predetermined surface of said workpiece and to dynamically vary the angular position of said welding torch relative to said predetermined surface of said workpiece and to dynamically vary the position of said pivot radially of said axis of said workpiece in a predetermined manner, the changing, by said position-changing member, of said position of said pivot radially of said axis of said workpiece enabling said angular movement of said welding torch about said pivot to vary the extent of reciprocation of said tip of said welding torch axially of said axis of said workpiece.

30. A welding machine which has movable work-supporting means that can hold and move a workpiece, a support for a welding torch that includes a pivot and that can hold said welding torch adjacent a surface of said workpiece while said workpiece is held and moved by said movable work-supporting means and that can move said welding torch toward and away from an axis of said workpiece, driving means to move said movable work-supporting means and thereby provide relative movement between said support for said welding torch and said movable work-supporting means and hence to provide relative movement between said welding torch and said surface of said workpiece and thereby enable said welding torch to confront a predetermined relatively-moving surface of said workpiece, support-moving means adapted to move said support for said welding torch angularly relative to said axis of said workpiece about said pivot and also to change the position of said pivot radially of said axis of said workpiece, during the time said driving means is providing said relative movement between said welding torch and said workpiece, to dynamicaly vary the angular position of said welding torch relative to said predetermined surface of said workpiece and to dynamically vary the position of said pivot radially of said axis of said workpiece in a predetermined manner, said support for said welding torch being pivotable about a given axis toward and away from said axis of said workpiece, and said support-moving means acting upon said support for said welding torch at a point intermediate said welding torch and said given axis, and thereby providing a multiplied movement of said welding torch.

31. A welding machine as claimed in claim 27 wherein said predetermined surface of said workpiece has radially-displaced portions, wherein said position-changing member automatically and dynamically displaces said pivot radially, relative to said axis of said workpiece, varying distances which enable the spacing between the tip of said welding torch and confronting parts of said predetermined surface of said workpiece to remain substantially constant even though some of said radially-displaced portions of said predetermined surface of said workpiece constitute some of said confronting parts of said predetermined surface of said workpiece.

32. A welding machine which has work-supporting means, a support for a welding torch that can hold said welding torch adjacent work held by said work-supporting means, said work having transversely-displaced surfaces thereon, said support for said welding torch including a pivot which enables said welding torch to rotate angularly relative to said transversely-displaced surfaces of said work, means to rotate the axis of said pivot transversely toward and away from said work and hence toward and away from said transversely-displaced surfaces on said work, and programming means which dynamically moves said axis of said pivot transversely toward and away from said work, said programming means dynamically varying the transverse positioning of said axis of said pivot, and hence of said welding torch, while maintaining a constant longitudinal positioning of the tip of said welding torch relative to said work.

* * * * *